United States Patent
Ikeda

(10) Patent No.: US 8,760,422 B2
(45) Date of Patent: Jun. 24, 2014

(54) INFORMATION PROCESSING APPARATUS, INFORMATION PROCESSING METHOD, AND PROGRAM

(75) Inventor: Tetsuo Ikeda, Tokyo (JP)

(73) Assignee: Sony Corporation, Tokyo (JP)

( * ) Notice: Subject to any disclaimer, the term of this patent is extended or adjusted under 35 U.S.C. 154(b) by 199 days.

(21) Appl. No.: 13/383,714

(22) PCT Filed: Jul. 22, 2010

(86) PCT No.: PCT/JP2010/062309

§ 371 (c)(1), (2), (4) Date: Jan. 12, 2012

(87) PCT Pub. No.: WO2011/024584

PCT Pub. Date: Mar. 3, 2011

(65) Prior Publication Data

US 2012/0113061 A1   May 10, 2012

(30) Foreign Application Priority Data

Aug. 27, 2009  (JP) .................................. 2009-197001

(51) Int. Cl.
*G09G 5/00*  (2006.01)

(52) U.S. Cl.
USPC .................... 345/173; 178/18.03; 715/863

(58) Field of Classification Search
USPC ........... 345/173, 174, 175; 178/18.03–18.07, 178/18.09, 18.11; 715/863, 864
See application file for complete search history.

(56) References Cited

U.S. PATENT DOCUMENTS

| | | | |
|---|---|---|---|
| 2006/0066590 A1 | 3/2006 | Ozawa et al. | |
| 2007/0262965 A1* | 11/2007 | Hirai et al. | 345/173 |
| 2009/0201246 A1* | 8/2009 | Lee et al. | 345/156 |
| 2009/0227295 A1* | 9/2009 | Kim | 455/566 |
| 2010/0001977 A1* | 1/2010 | Lin et al. | 345/174 |
| 2010/0026649 A1* | 2/2010 | Shimizu et al. | 345/173 |
| 2010/0302177 A1* | 12/2010 | Kim et al. | 345/173 |
| 2011/0029185 A1* | 2/2011 | Aoki et al. | 701/29 |
| 2011/0109578 A1* | 5/2011 | Waller et al. | 345/173 |

FOREIGN PATENT DOCUMENTS

| | | |
|---|---|---|
| JP | 2006-127488 | 5/2006 |
| JP | 2008-244743 | 10/2008 |
| WO | WO 2006/027924 A1 | 3/2006 |

OTHER PUBLICATIONS

International Search Report from the Japanese Patent Office in International Application No. PCT/JP2010/062309 mailed Oct. 12, 2010.

* cited by examiner

*Primary Examiner* — Tom Sheng
(74) *Attorney, Agent, or Firm* — Sherr & Jiang, PLLC

(57) ABSTRACT

Provided is an information processing apparatus including a position detection unit for detecting positions of a plurality of operating tools pressing a screen, a pressure intensity detection unit for detecting pressure intensity of each of the operating tools, a storage unit having recorded thereon predetermined relative information indicating a relative position and a pressure intensity ratio between operating tools, a relative information detection unit for detecting the predetermined relative information that is approximate to the relative position between operating tools obtained from information on the positions detected by the position detection unit and the pressure intensity ratio between operating tools obtained from information on the pressure intensity detected by the pressure intensity detection unit, and a function providing unit for providing a predetermined function corresponding to the predetermined relative information detected by the relative information detection unit.

13 Claims, 15 Drawing Sheets

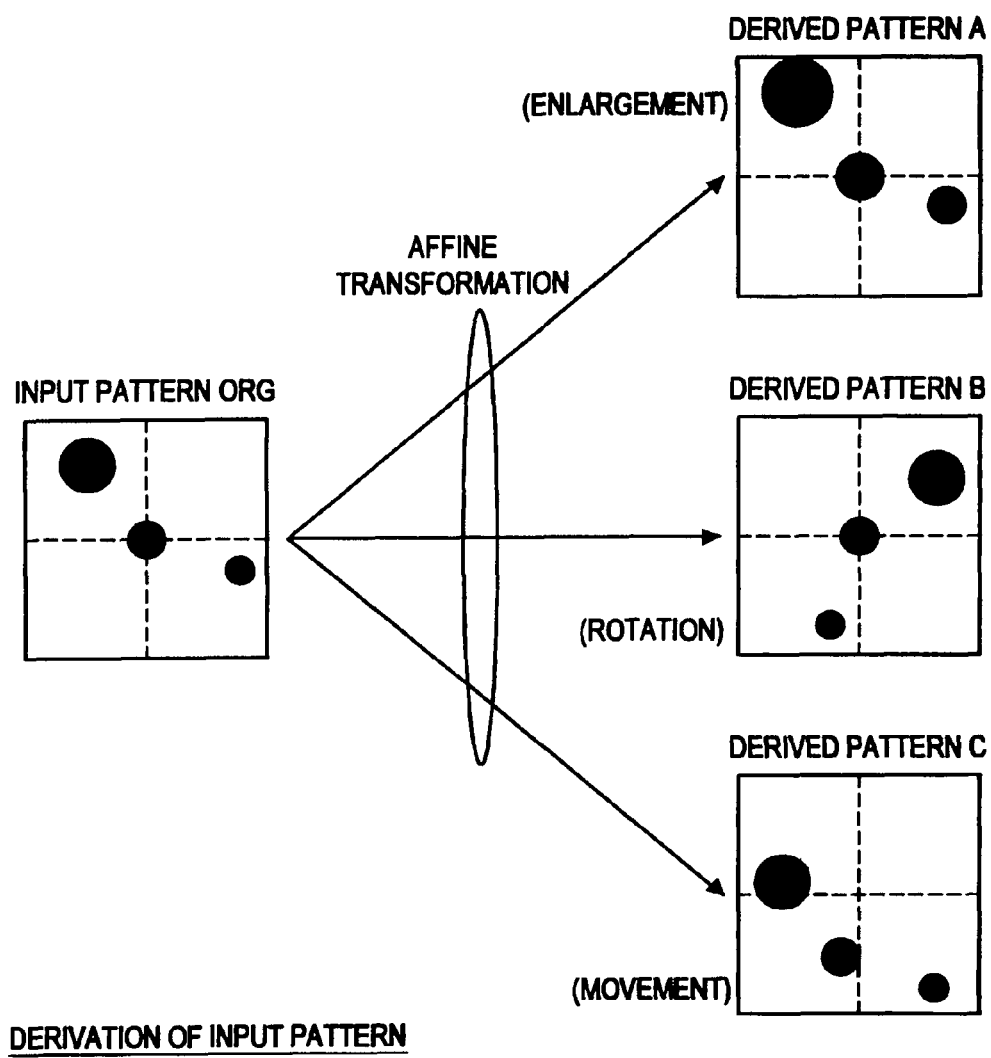

FIG.3B
PATTERN MATCHING
DERIVED PATTERN A
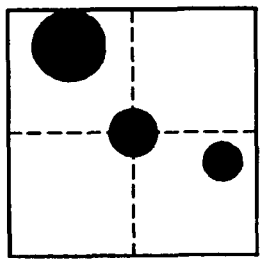
REGISTERED PATTERN A
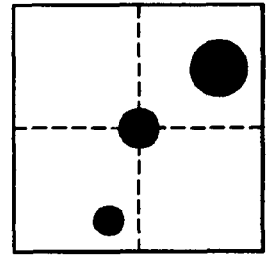
DERIVED PATTERN B
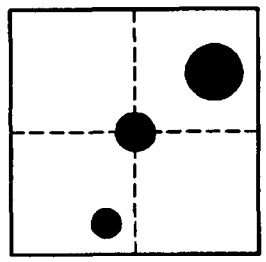
REGISTERED PATTERN B
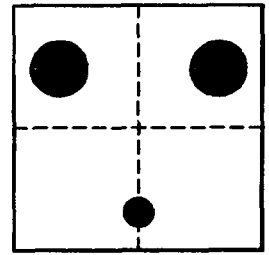
DERIVED PATTERN C
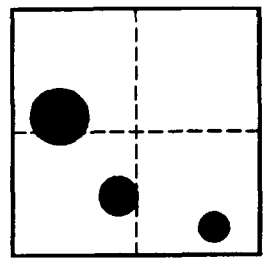
REGISTERED PATTERN C
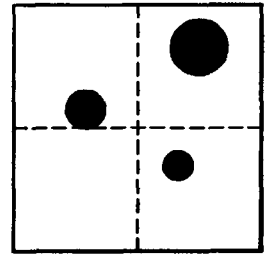

|          | X-COORDINATE | Y-COORDINATE | PRESSURE INTENSITY |
|----------|--------------|--------------|--------------------|
| FINGER 1 | 0            | 0            | MEDIUM             |
| FINGER 2 | 10           | 5            | HIGH (STRONG)      |
| FINGER 3 | -5           | -10          | LOW (WEAK)         |

|          | X-COORDINATE | Y-COORDINATE | PRESSURE INTENSITY |
|----------|--------------|--------------|--------------------|
| FINGER 1 | -5           | 10           | HIGH (STRONG)      |
| FINGER 2 | 5            | 10           | HIGH (STRONG)      |
| FINGER 3 | 0            | -10          | LOW (WEAK)         |

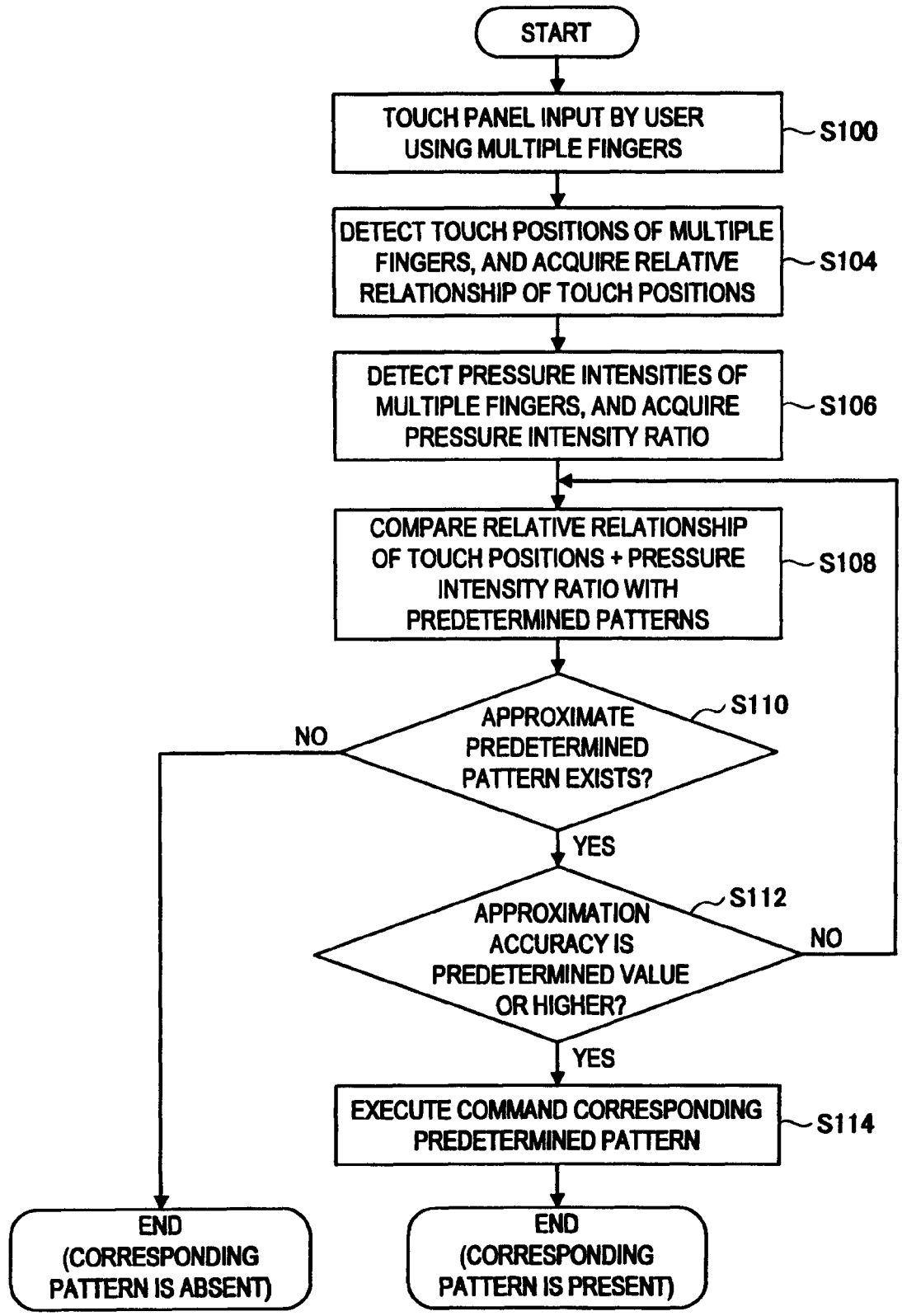

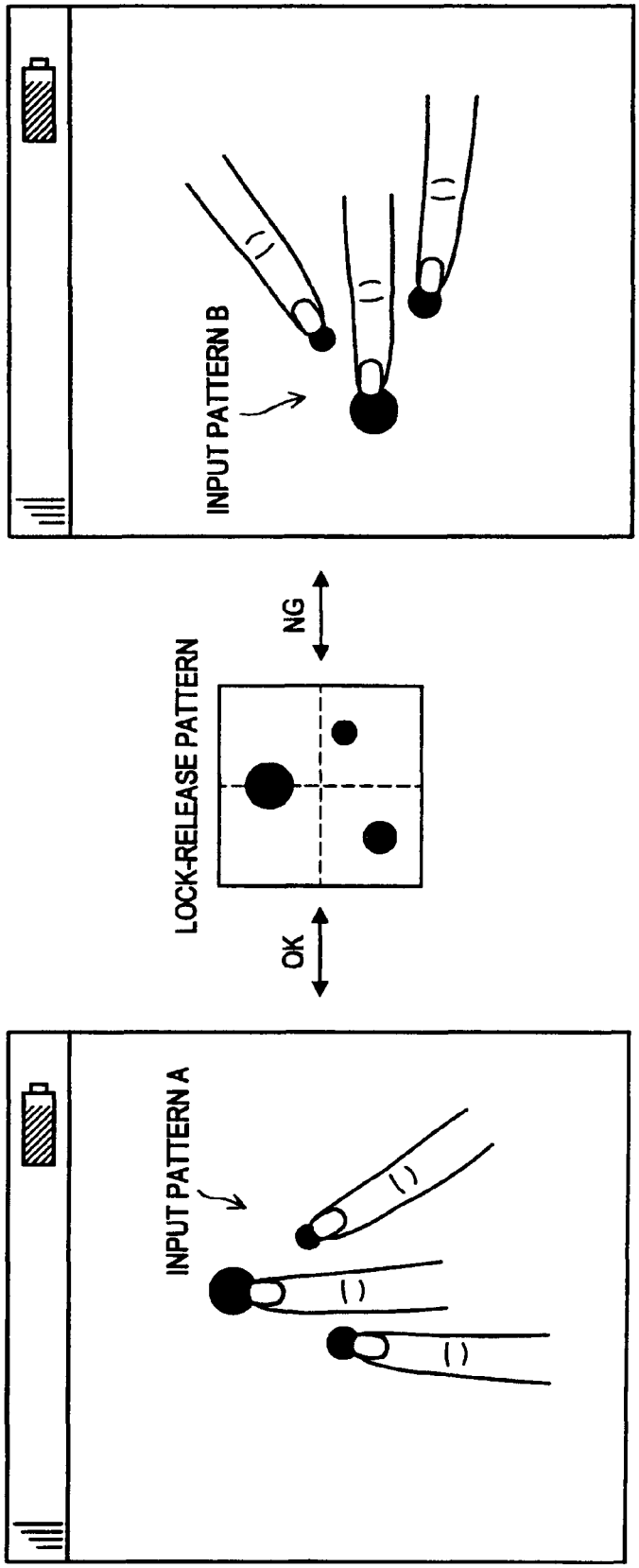

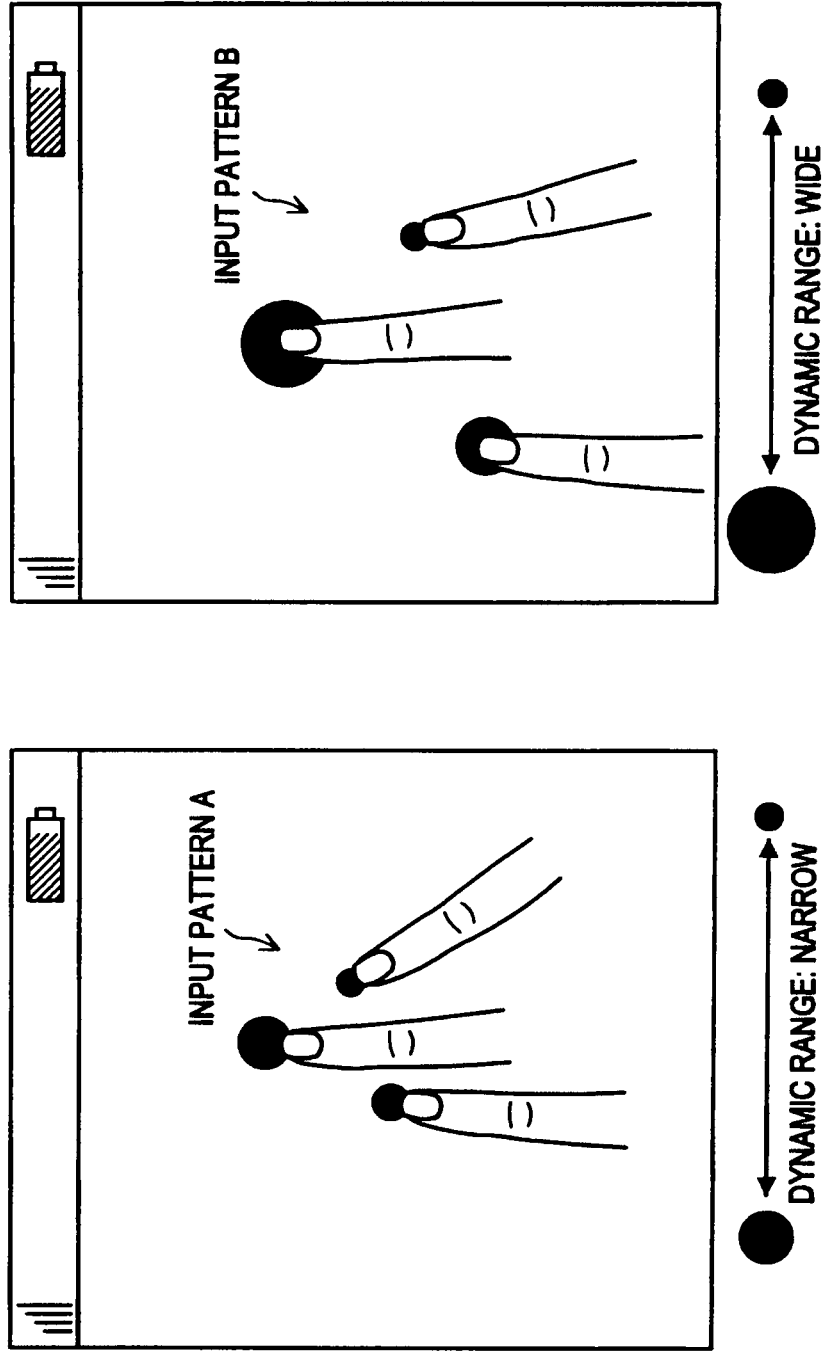

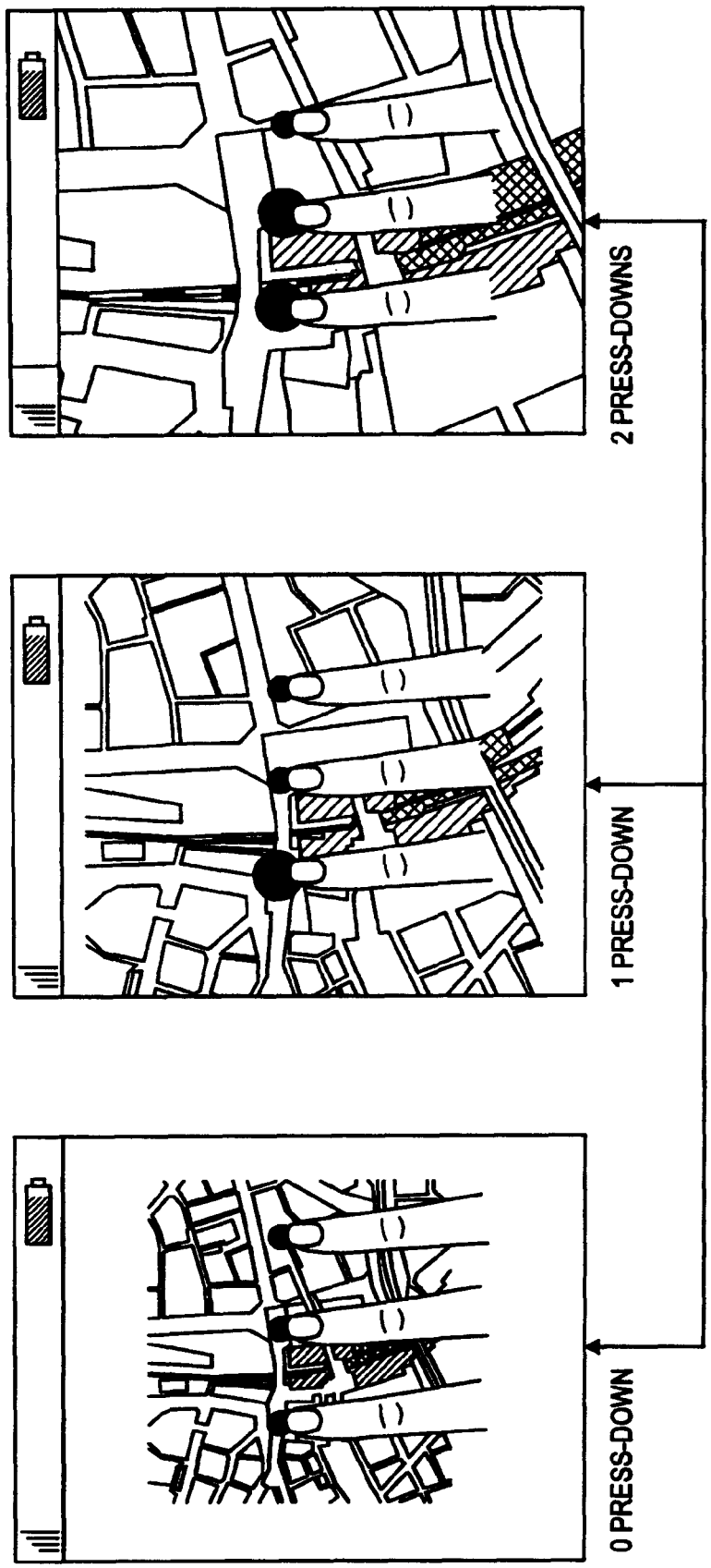

INFORMATION PROCESSING APPARATUS, INFORMATION PROCESSING METHOD, AND PROGRAM

TECHNICAL FIELD

The present invention relates to an information processing apparatus, an information processing method, and a program.

BACKGROUND ART

In recent years, a touch panel has come to be widely used as an input device in an electronic appliance, such as a mobile phone, a portable information terminal or the like. The touch panel is installed in a display device such as a liquid crystal display, an organic electroluminescence display or the like. As types of touch panels, touch panels of a resistive method, a capacitive method, and an optical method are known, for example. A user is allowed, according to any of these methods, to perform a desired operation by directly touching or sliding an operation object displayed on the display device. Therefore, an intuitive operating system is realized by the touch panel.

As technology relating to the touch panel, technology for performing key lock control of a mobile phone by using a touch switch is disclosed in Patent Literature 1 below, for example. Furthermore, technology for controlling on/off of key lock based on the order of operations of two touch switches is disclosed in the Literature. When using the technology described in the Literature, it becomes possible to prevent one from erroneously performing an on/off operation of key lock. In this manner, the convenience of a user can be improved by making good use of the touch switch and the touch panel.

CITATION LIST

Patent Literature

Patent Literature 1: JP 2008-244743A

SUMMARY OF INVENTION

Technical Problem

Although only the technology for performing key lock control of a mobile phone by using a touch switch is described in the above-described Literature, various other researches are conducted regarding the application of the touch panel. Particularly, many refinements are being proposed regarding a display method of an operation object used for operation of the touch panel.

When using the touch panel as an input device, if operation objects are displayed on the display device, the display area is narrowed to that extent. Thus, expanding an effective display area is a large issue. In relation to such an issue, a method of reducing the size of operation objects is conceivable as one solution, for example. However, if the size of operation objects is reduced, it becomes difficult to accurately touch each operation object, and occurrence of incorrect operations will increase.

Also, a method of setting a plurality of specific areas in a touch panel in advance and assigning a predetermined function to the order by which the user touches the specific areas is conceivable as one solution. When using this method, a predetermined function is realized according to the touching order of the user. That is, by assigning a predetermined function to a rule called "order," it becomes possible, regarding an operation for realizing the function assigned to the "order," to perform the operation without using the operation object. As a result, the number of operation objects to be displayed can be reduced.

However, it is difficult to assign a large number of functions to the orders of touching. For example, if the order of touching is complicated by setting a large number of specific areas, while a large number of functions can be assigned, a user will have difficulty remembering the order. For this reason, it is difficult to assign a very large number of functions to the orders of touching. Additionally, there is also an idea of displaying auxiliary information for aiding a user's memory, but an effective display area is narrowed to the extent that the auxiliary information is displayed. For this reason, an operating system that is capable of realizing a larger number of functions with comparatively simple operation steps is desired.

Accordingly, the present invention is made in view of the above problem, and the object of the present invention is to provide an information processing apparatus, an information processing method, and a program which are novel and improved, and which are capable of realizing a larger number of functions with comparatively simple input operations that use a touch panel.

Solution to Problem

According to the first aspect of the present invention, in order to achieve the above-mentioned object, there is provided an information processing apparatus including a position detection unit for detecting positions of a plurality of operating tools pressing a screen, a pressure intensity detection unit for detecting pressure intensity of each of the operating tools, a storage unit having recorded thereon predetermined relative information indicating a relative position and a pressure intensity ratio between operating tools, a relative information detection unit for detecting the predetermined relative information that is approximate to the relative position between operating tools obtained from information on the positions detected by the position detection unit and the pressure intensity ratio between operating tools obtained from information on the pressure intensity detected by the pressure intensity detection unit, and a function providing unit for providing a predetermined function corresponding to the predetermined relative information detected by the relative information detection unit.

The storage unit may have stored thereon coordinate information indicating, as the predetermined relative information indicating the relative position between operating tools, position coordinates of each of the operating tools, and intensity information indicating, as the predetermined relative information indicating the pressure intensity ratio between operating tools, the pressure intensity of each of the operating tools. The relative information detection unit may detect the coordinate information that is approximate by applying common translation/rotation operation to the position coordinates of each of the operating tools detected as the information on the positions by the position detection unit, and detect the intensity information that is approximate by increasing or decreasing, at a same rate, the pressure intensity of each of the operating tools detected as the information on the pressure intensity by the pressure intensity detection unit.

The storage unit may have recorded thereon the predetermined relative information for release of a lock state in which a user operation is locked. The relative information detection unit may detect the relative information, recorded on the storage unit for release of the lock state, that is approximate to the relative position between operating tools obtained from the information on the positions detected by the position detection unit while in the lock state and the pressure intensity ratio between operating tools obtained from the information on the pressure intensity detected by the pressure intensity detection unit while in the lock state. The function providing unit may release the lock state in a case the relative information recorded on the storage unit for release of the lock state is detected by the relative information detection unit.

When in the lock state, the relative information detection unit may detect the coordinate information that is approximate by applying only the common translation to the position coordinates of each of the operating tools detected as the information on the positions by the position detection unit.

When in the lock state, the relative information detection unit may detect the intensity information that is approximate by increasing or decreasing, at a rate not exceeding a predetermined value, the pressure intensity of each of the operating tools detected as the information on the pressure intensity by the pressure intensity detection unit.

The storage unit may have recorded thereon the predetermined relative information that is associated with a playback control function for performing playback control of content. The function providing unit may provide the playback control function corresponding to the predetermined relative information detected by the relative information detection unit.

The information processing apparatus may further include a light source for emitting light from within the screen, and an optical sensor capable of detecting intensity of light reflected by an operating tool pressing the screen when light is emitted from the light source. The pressure intensity detection unit may detect an area of the operating tool that strongly reflected the light emitted from the light source based on the intensity of light detected by the optical sensor, and detects the pressure intensity based on a size of the area.

The information processing apparatus may further include a pressure sensor, on the screen, capable of detecting pressure. The pressure intensity detection unit may detect the pressure intensity of the operating tool based on a magnitude of the pressure detected by the pressure sensor.

According to another aspect of the present invention, in order to achieve the above-mentioned object, there is provided an information processing apparatus including a light source for emitting light from within a screen to outside, an imaging unit for capturing an image of an operating tool pressing the screen by forming an image from light that is reflected by the operating tool pressing the screen in a case light is emitted from the light source, and a pattern image detection unit for detecting, from pattern images prepared in advance, a predetermined pattern image that is approximate to the image of the operating tool captured by the imaging unit. In a case the screen is pressed by a plurality of operating tools and images of the operating tools are captured by the imaging unit, the pattern image detection unit detects a predetermined pattern image to which a relative position of each of the operating tools included in the image captured by the imaging unit and a size ratio between each of the operating tools are approximate.

According to another aspect of the present invention, in order to achieve the above-mentioned object, there is provided an information processing method including detecting positions of a plurality of operating tools pressing a screen, detecting pressure intensity of each of the operating tools, detecting predetermined relative information, indicating a relative position and a pressure intensity ratio between operating tools, that is approximate to a relative position between the operating tools obtained from information on the positions detected in the step of detecting positions and a pressure intensity ratio between the operating tools obtained from information on the pressure intensity detected in the step of detecting pressure intensity, and providing a predetermined function corresponding to the predetermined relative information detected in the step of detecting predetermined relative information.

According to another aspect of the present invention, in order to achieve the above-mentioned object, there is provided an information processing method including capturing, in a case light emitted from within a screen to outside is reflected by an operating tool pressing the screen, an image of the operating tool pressing the screen by forming an image from the reflected light, and detecting, from pattern images prepared in advance, a predetermined pattern image that is approximate to the image of the operating tool captured in the step of capturing. In a case the screen is pressed by a plurality of operating tools and images of the operating tools are captured in the step of capturing, a predetermined pattern image to which a relative position of each of the operating tools included in the image captured in the step of capturing and a size ratio between each of the operating tools are approximate is detected in the step of detecting.

According to another aspect of the present invention, in order to achieve the above-mentioned object, there is provided a program for causing a computer to realize a position detection function of detecting positions of a plurality of operating tools pressing a screen, a pressure intensity detection function of detecting pressure intensity of each of the operating tools, a relative information detection function of detecting predetermined relative information, indicating a relative position and a pressure intensity ratio between operating tools, that is approximate to a relative position between the operating tools obtained from information on the positions detected by the position detection function and a pressure intensity ratio between the operating tools obtained from information on the pressure intensity detected by the pressure intensity detection function, and a function providing function of providing a predetermined function corresponding to the predetermined relative information detected by the relative information detection function.

According to another aspect of the present invention, in order to achieve the above-mentioned object, there is provided a program for causing a computer to realize an imaging function of capturing, in a case light emitted from within a screen to outside is reflected by an operating tool pressing the screen, an image of the operating tool pressing the screen by forming an image from the reflected light, and a pattern image detection function of detecting, from pattern images prepared in advance, a predetermined pattern image that is approximate to the image of the operating tool captured by the imaging function. In a case the screen is pressed by a plurality of operating tools and images of the operating tools are captured by the imaging function, the computer is caused to realize a function of detecting a predetermined pattern image to which a relative position of each of the operating tools included in the image captured by the imaging function and a size ratio between each of the operating tools are approximate.

According to another aspect of the present invention, in order to achieve the above-mentioned object, there is provided a computer-readable recording medium on which the program is recorded.

Advantageous Effects of Invention

As described above, according to the present invention, it is possible to realize a larger number of functions by comparatively simple input operations that use a touch panel.

BRIEF DESCRIPTION OF DRAWINGS

FIG. 3A is an explanatory diagram showing a part of the operation of an input pattern analysis unit included in the information processing apparatus according to the embodiment.

FIG. 3B is an explanatory diagram showing a part of the operation of the input pattern analysis unit included in the information processing apparatus according to the embodiment.

FIG. 5 is an explanatory diagram showing an operation flow of the information processing apparatus according to the embodiment.

FIG. 7C is an explanatory diagram showing a lock-release method according to the embodiment.

FIG. 7D is an explanatory diagram showing a lock-release method according to the embodiment.

FIG. 8 is an explanatory diagram showing a display size control method according to the embodiment.

DESCRIPTION OF EMBODIMENTS

Figure 1:
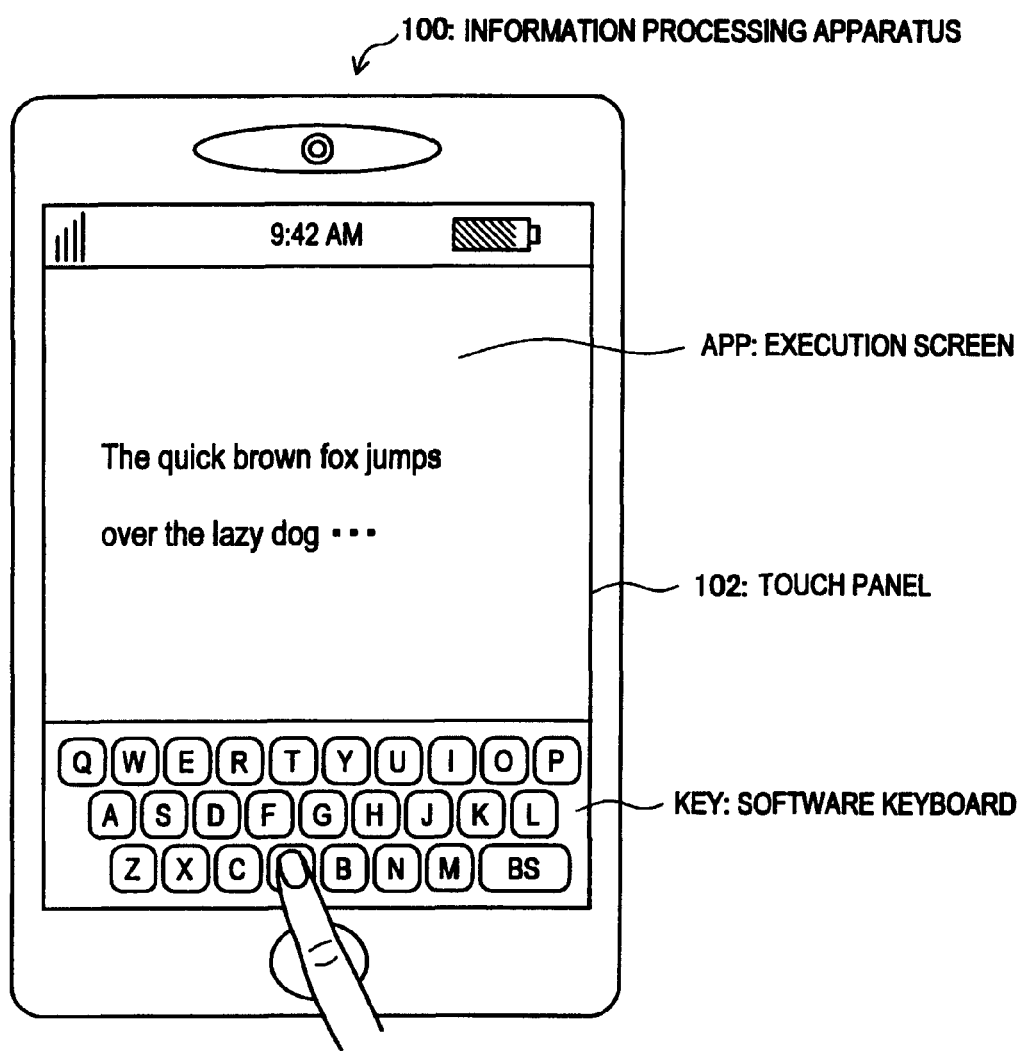
FIG. 1 is an explanatory diagram showing an appearance of an information processing apparatus according to a first embodiment of the present invention.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

[Flow of Explanation]

Here, the flow of explanation related to embodiments of the present invention described below will be briefly described.

First, the appearance of an information processing apparatus 100 according to a first embodiment of the present invention will be described with reference to FIG. 1. Next, the functional configuration of the information processing apparatus 100 according to the embodiment will be described with reference to FIG. 2. Then, a part of the operation of an input pattern analysis unit 104 included in the information processing apparatus 100 according to the embodiment will be described with reference to FIGS. 3A and 3B. Herein, a structure of registered pattern information stored in a storage unit 108 included in the information processing apparatus 100 according to the embodiment will be described with reference to FIGS. 4A and 4B.

Next, an operation flow of the information processing apparatus 100 according to the embodiment will be described with reference to FIG. 5. Next, a playback control method according to the embodiment will be described in comparison with a general playback control method, with reference to FIGS. 6A, 6B and 6C. Then, a lock-release method according to the embodiment will be described in comparison with a general lock-release method, with reference to FIGS. 7A, 7B, 7C and 7D. Then, a display size control method according to the embodiment will be described with reference to FIG. 8.

Next, the functional configuration of an information processing apparatus 200 according to a second embodiment of the present invention will be described with reference to FIGS. 9 and 10. Then, an example hardware configuration of the information processing apparatuses 100, 200 according to the first and second embodiments of the present invention will be described with reference to FIG. 11. Lastly, technical ideas of the embodiments of the present invention will be summarized, and effects obtained by the technical ideas will be briefly described.

(Explanation Items)
1. First Embodiment
   1-1: Configuration of Information Processing Apparatus 100
      1-1-1: Appearance
      1-1-2: Functional Configuration
      1-1-3: Input Pattern Analysis Method
      1-1-4: Operation Flow
   1-2: Playback Control Method
      1-2-1: Playback Control by Playback Button
      1-2-2: Playback Control according to Pressure Intensity Ratio
   1-3: Lock-Release Method
      1-3-1: Lock-Release by Password Input
      1-3-2: Lock-Release according to Touch Position
      1-3-3: Lock-Release according to Pressure Intensity Ratio
   1-4: Display Size Control Method
2. Second Embodiment
   2-1: Configuration of Information Processing Apparatus 200
3: Example Hardware Configuration
4: Summary 1. First Embodiment A first embodiment of the present invention will be described. The present embodiment is for realizing a highly convenient operating system that is based on a plurality of operating tools (for example, fingers, styluses, and the like) by using a touch panel capable of detecting pressure intensity. Additionally, in the present embodiment, as the touch panel capable of detecting pressure intensity, a pressure-sensitive touch panel capable of detecting pressure from an operating tool is assumed. Also, the explanation will be given assuming that the operating tool is a finger of a user. Of course, the type of operating tool to which the technology of the present embodiment can be applied is not limited to such.

[1-1: Configuration of Information Processing Apparatus 100]

In the following, the configuration of the information processing apparatus 100 according to the present embodiment will be described. Additionally, the function of the information processing apparatus 100 can be realized by using, for example, a PC (Personal Computer), a mobile phone, a portable information terminal, a car navigation system, a television, a display device, a portable audio device, a portable game machine, or the like. Moreover, an explanation will be given below with a portable information terminal in mind.

(1-1-1: Appearance)

First, the appearance of the information processing apparatus 100 according to the present embodiment and an overview of the technology according to the present embodiment will be described with reference to FIG. 1. FIG. 1 is an explanatory diagram showing the appearance of the information processing apparatus 100 according to the present embodiment.

As shown in FIG. 1, the information processing apparatus 100 includes a touch panel 102. Additionally, this touch panel 102 is capable of detecting a position a user touched with a finger (hereinafter, touch position) and the intensity of pressure (hereinafter, pressure intensity) obtained at the time of touching. Accordingly, the information processing apparatus 100 can use the information on the touch position and pressure intensity as input information of the user.

Furthermore, when touch is performed by a plurality of fingers (hereinafter, multi-touch), this touch panel 102 is capable of detecting the touch position and pressure intensity of each finger. Thus, the information processing apparatus 100 can acquire information on the touch position and pressure intensity of each finger by using the touch panel 102. The technology according to the present embodiment aims to realize an operating system with higher convenience by using these pieces of information.

For example, let us consider an operation performed at the time of inputting characters using a software keyboard KEY (see FIG. 1). The software keyboard KEY is not a keyboard that is physically provided to the housing of the information processing apparatus 100, but a keyboard resembling a physical keyboard that is displayed on a screen by software. Moreover, since the touch panel 102 is installed on the information processing apparatus 100, when a character key of the software keyboard KEY is touched with a finger, the information processing apparatus 100 can grasp which character key is touched. Thus, the same function as a physical keyboard can be realized.

Additionally, a portable information terminal is kept in mind here, and thus a character input operation by the software keyboard KEY is taken as an example, but it should be noted that the following contents also apply to a character input operation by a physical keyboard.

Now, in many cases, a character that is input in a certain input mode (for example, an alphanumeric/lowercase input mode) is displayed in a format corresponding to the input mode (for example, an alphanumeric/lowercase character). In the case of changing the format of an input character, a user selects an input character, causes a menu for format change to be displayed, and selects a desired format from the menu. However, such an operation includes a large number of operation steps and is extremely inconvenient. To solve such an inconvenience, a method is conceivable of using a mechanism of having an operation for format change assigned to a predetermined input pattern (gesture) and changing the format by using the input pattern.

For example, a mechanism is conceivable according to which the format of an input character is changed to uppercase in the case a character key is touched with one finger A and the top right of the screen is touched with another finger B at the same time. Also, a mechanism is conceivable according to which the format of the input character is changed again to lowercase in the case the top left of the screen is touched with the finger B at the same time. In this manner, by assigning a format to a combination (input pattern) of positions to be touched with a plurality of fingers, it becomes possible to perform format change of an input character without performing display of a menu or a selection operation.

However, the types of formats are numerous. On the other hand, the number of input patterns that can be expressed by combinations of positions to be touched is limited. Thus, it is difficult to assign all the formats that a user would mainly use to the combinations of touch positions. Of course, logically, it is possible to realize a large number of input patterns by dividing the display screen into small areas and finely defining combinations of touch positions. However, in reality, it is difficult for a user to accurately touch each of the finely divided areas. Also, for a user to remember which format is assigned to which area would be a heavy burden for the user.

For this reason, it would be hard in reality to assign a large number of formats to combinations of touch positions. Thus, use of information different from the touch position has been considered. Then, as a result of the consideration, a method of using the pressure intensity described above has been proposed. When using the pressure intensity, a plurality of formats can be assigned to the same touch position, for example. Thus, a large number of input patterns can be expressed without dividing the display screen into small areas. For example, a mechanism can be realized according to which, when strong press-down is performed at a touch position assigned with a format change operation for changing to uppercase, the typeface is changed to bold, and when press-down is performed at a medium intensity, the typeface is changed to italic.

The number of input patterns that can be expressed certainly increases by combining the pressure intensity. However, even if the touch position and the pressure intensity are combined, only a part of format change operations can be assigned to these combinations when considering the types of fonts, superscript/subscript, and the like. Thus, to enable to express a larger number of input patterns, a method of causing the pressure intensity of the finger B to be multi-staged rather than three-staged, high, medium and low, has been considered. When the pressure intensity is made multi-stage, a larger number of input patterns can be certainly expressed.

However, the degree of pressure intensity is dependent on each individual's sense, and for a user to accurately control the subtle degree of pressure intensity and to reproduce a predetermined pressure intensity each time would be extremely difficult. Thus, the present inventor has come up with a method of using a relative pressure intensity between the finger A and the finger B (hereinafter, relative intensity). Furthermore, since an operation for a user to accurately touch a small area on the screen without a guide is comparatively difficult, a relative touch position (hereinafter, relative position) will be used in the present embodiment with respect to the touch positions. That is, in the present embodiment, a method of assigning a predetermined operation to a combination (input pattern) of a relative position and a relative intensity is proposed.

Additionally, in the above explanation, a format change operation at the time of character input was taken as an example, but the application scope of the method according to the present embodiment is not limited to such, and any operation that can be realized using the touch panel 102 and any function that can be realized by the information processing apparatus 100 are included in the application scope. Also, a multi-touch using two fingers was assumed in the above example, but the method according to the present embodiment is also applicable to a multi-touch using three or more fingers. In the following, a multi-touch using three fingers A, B, and C is assumed.

In the foregoing, the appearance of the information processing apparatus 100 and the overview of the technology of the present embodiment have been described.

(1-1-2: Functional Configuration)

Figure 2:
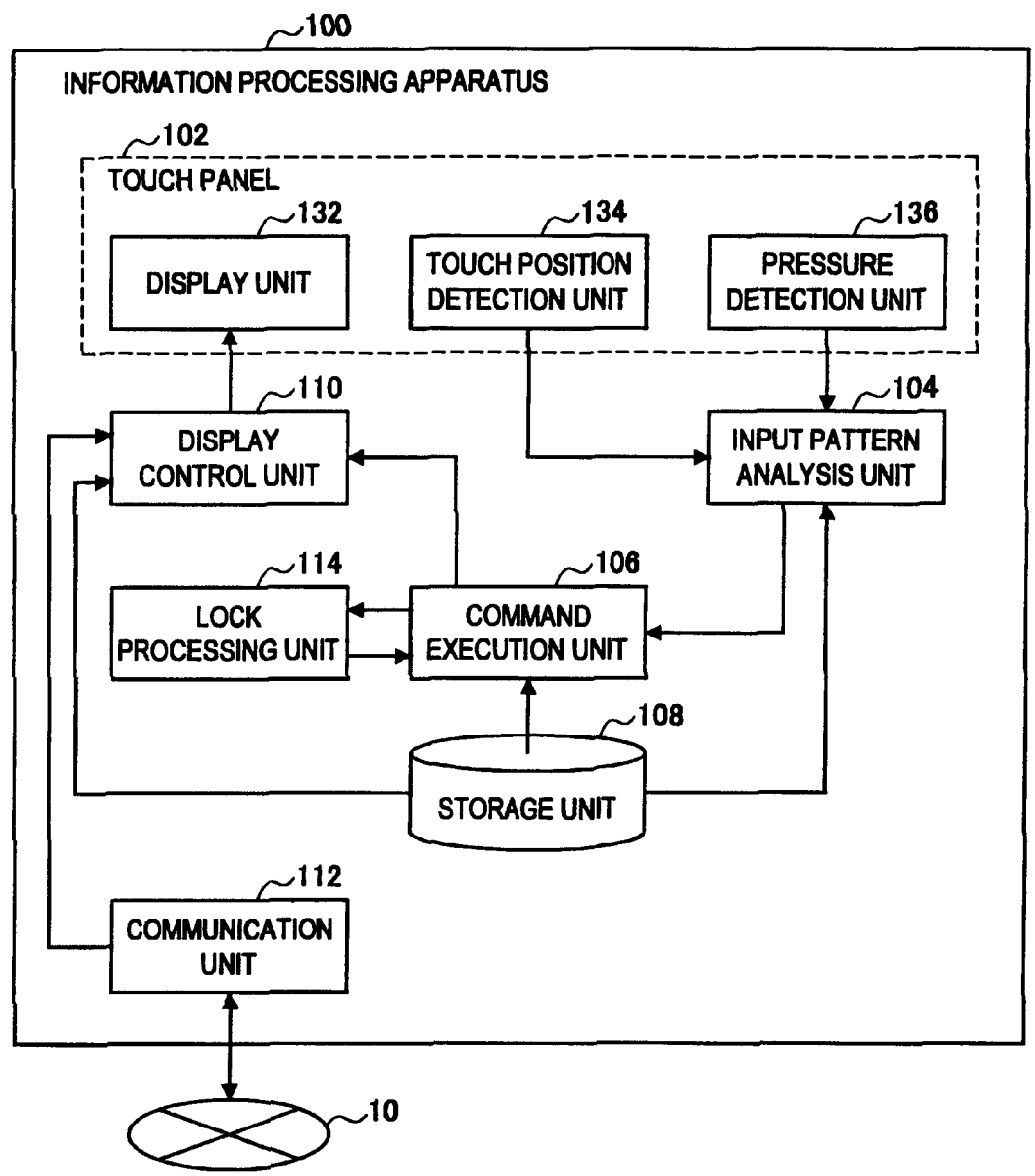
FIG. 2 is an explanatory diagram showing an example functional configuration of the information processing apparatus according to the embodiment.

Next, the functional configuration of the information processing apparatus 100 according to the present embodiment will be described with reference to FIG. 2. FIG. 2 is an explanatory diagram showing an example functional configuration of the information processing apparatus 100 according to the present embodiment. Additionally, the function of the information processing apparatus 100 illustrated in FIG. 2 can be realized by the hardware configuration illustrated in FIG. 11.

As shown in FIG. 2, the information processing apparatus 100 is configured mainly from a touch panel 102, an input pattern analysis unit 104, a command execution unit 106, a storage unit 108, a display control unit 110, a communication unit 112, and a lock processing unit 114. Moreover, the touch panel 102 includes a display unit 132, a touch position detection unit 134, and a pressure detection unit 136.

The display unit 132 is a display device such as an LCD (Liquid Crystal Display), an ELD (Electro-Luminescence Display), or a PDP (Plasma Display Panel), for example. Also, the touch position detection unit 134 is means for detecting a touch position. Furthermore, the pressure detection unit 136 is means for detecting the intensity of pressure (pressure intensity) at the touch position. The function of the pressure detection unit 136 is realized by a pressure measurement film, a surface pressure measurement sheet, or the like, for example.

First, when the touch panel 102 is touched by a finger A, a finger B, and a finger C, each of the touch position of the finger A (touch position A), the touch position of the finger B (touch position B) and the touch position of the finger C (touch position C) is detected by the touch position detection unit 134. Also, each of the intensity of the pressure at the touch position A (pressure intensity A), the intensity of the pressure at the touch position B (pressure intensity B) and the intensity of the pressure at the touch position (pressure intensity C) is detected by the pressure detection unit 136.

Information on the touch positions A, B, and C detected by the touch position detection unit 134 is input to the input pattern analysis unit 104. Furthermore, information on the pressure intensities A, B, and C detected by the pressure detection unit 136 is also input to the input pattern analysis unit 104. When the information on the touch positions A, B, and C is input, the input pattern analysis unit 104 grasps the relative position of the touch positions A, B, and C based on the input information. Also, when the information on the pressure intensities A, B, and C is input, the input pattern analysis unit 104 grasps the relative intensity of the pressure intensities A, B, and C. Additionally, the expression "grasp" is used here, but information corresponding to the relative position and the relative intensity is calculated as will be described later.

For example, the information on the relative position of the touch positions A, B, and C can be expressed by two position vectors $V_{AB}$ and $V_{AC}$ extending from the touch position A to the touch positions B and C. For example, when the touch position A is determined, the touch position B is determined by the position vector $V_{AB}$ and the touch position C is determined by the position vector $V_{AC}$. That is, even if the touch position A moved, the relative positional relationship among the touch positions A, B, and C determined by the two position vectors $V_{AB}$ and $V_{AC}$ does not change. Furthermore, the relative positional relationship among the touch positions A, B, and C does not change with regard to rotation of the coordinate system.

On the other hand, information on the relative intensity of the pressure intensities A, B, and C can be expressed by the magnitude relationship between the pressure intensities A, B, and C. This magnitude relationship can be expressed, for example, by an intensity ratio $r_{AB}$ between the pressure intensities A and B, an intensity ratio $r_{BC}$ between the pressure intensities B and C, and an intensity ratio $r_{CA}$ between the pressure intensities C and A. For example, if $r_{AB}$=pressure intensity A/pressure intensity B>1, then pressure intensity A>pressure intensity B. Likewise, the magnitude relationship described above can be expressed by a difference $d_{AB}$ between the pressure intensities A and B, the difference $d_{BC}$ between the pressure intensities B and C, and the difference $d_{CA}$ between the pressure intensities C and A. For example, if $d_{AB}$=pressure intensity A−pressure intensity B>0, then pressure intensity A>pressure intensity B.

The information on the relative position and the relative intensity is grasped by the input pattern analysis unit 104 in this manner. Furthermore, the information on the touch positions A, B, and C, and the information on the pressure intensities A, B, and C can be expressed by a graphic pattern such as an input pattern ORG shown in FIG. 3A. The centre positions of the black circles included in the input pattern ORG express the touch positions A, B, and C. On the other hand, the sizes of the black circles included in the input pattern ORG express the pressure intensities A, B, and C.

For example, if the distribution of the pressure intensities within the display screen can be obtained by the touch panel 102, then the input pattern ORG shown in FIG. 3A can be directly obtained. Furthermore, the graphic pattern of the input pattern ORG shown in FIG. 3A can also be generated by the input pattern analysis unit 104 from the information on the touch positions A, B, and C, and the information on the pressure intensities A, B, and C. When considering based on the expression of the graphic pattern, a graphic pattern that is obtained by arbitrarily transforming the coordinate system (translation of the origin, rotation, or the like) is included in the information on the relative position. On the other hand, a graphic pattern where all the black circles are enlarged or reduced at the same rate is included in the information on the relative intensity.

As described, the information on the relative position and relative intensity grasped by the input pattern analysis unit 104 corresponds, as shown in FIG. 3A, to a graphic pattern where the black circles of the input pattern ORG are enlarged (hereinafter, derived pattern A), a graphic pattern which is the rotated input pattern ORG (hereinafter, derived pattern B), a graphic pattern which is the translated input pattern ORG (hereinafter, derived pattern C), and the like. Additionally, affine transformation is used for the transformation from the input pattern ORG to the derived patterns A, B, and C, for example.

Furthermore, transformation of a graphic pattern (including transformation of the coordinate system) is realized by performing predetermined computation on the coordinate values indicating the touch positions A, B, and C, or on the numerical values indicating the pressure intensities A, B, and C. Moreover, in the case the input pattern ORG is imaged by the input pattern analysis unit 104, images of the derived patterns A, B, and C can be generated by image processing. In this manner, the input pattern analysis unit 104 calculates the information on the relative position and the relative intensity corresponding to the derived patterns A, B, and C illustrated in FIG. 3A.

When the information on the relative position and the relative intensity is calculated, the input pattern analysis unit 104 compares predetermined graphic patterns (hereinafter, registered patterns) and the derived patterns A, B, and C, and detects registered patterns that are the most approximate to the derived patterns A, B, and C. Moreover, information on the registered pattern is recorded in advance in the storage unit 108. The position information (X coordinate, Y coordinate) of each touch position (finger 1, finger 2, finger 3) and a pressure intensity are recorded in association with each other in the storage unit 108 as the information on the registered pattern, as shown in FIGS. 4A and 4B, for example.

Figure 4A:
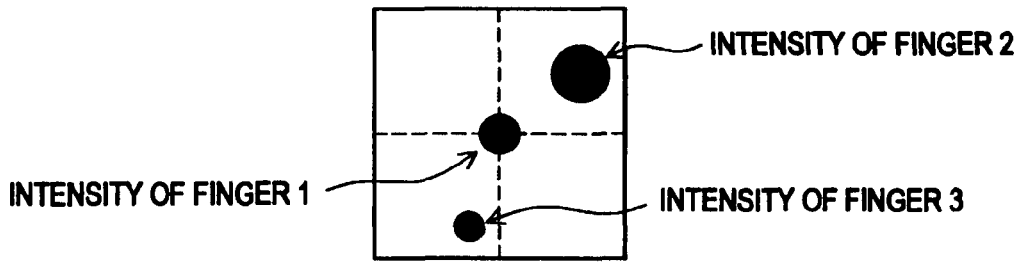
FIG. 4A is an explanatory diagram showing an example of registered pattern information stored in a storage unit included in the information processing apparatus according to the embodiment.
Figure 4B:
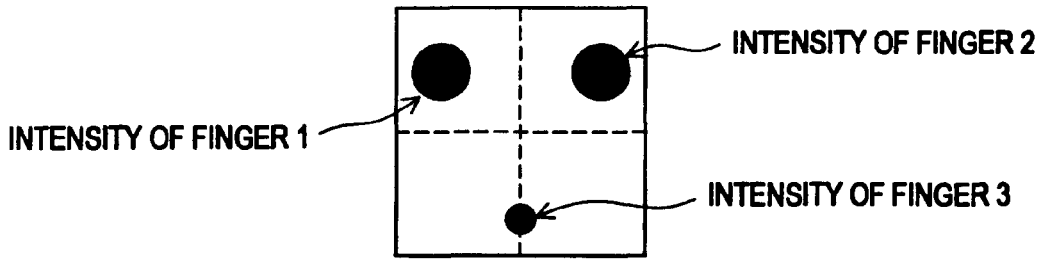
FIG. 4B is an explanatory diagram showing an example of the registered pattern information stored in the storage unit included in the information processing apparatus according to the embodiment.

FIG. 4A illustrates information on a registered pattern A. In the example of FIG. 4A (registered pattern A), a finger 1 is set to a touch position (0, 0) and pressure intensity "medium," a fier 2 is set to a touch position (10, 5) and pressure intensity "high," and a finger 3 is set to a touch position (−5, −10) and pressure intensity "low." Also, FIG. 4B illustrates information on a registered pattern B. As in the case of FIG. 4A, in the example of FIG. 4B (registered pattern B), a finger 1 is set to a touch position (−5, 10) and pressure intensity "high," a finger 2 is set to a touch position (5, 10) and pressure intensity "high," and a finger 3 is set to a touch position (0, −10) and pressure intensity "low."

As described above, the input pattern analysis unit 104 compares the information on each derived pattern and the information on the registered patterns and selects registered patterns that are the most approximate to respective derived patterns, as shown in FIG. 3B. When registered patterns that are approximate to respective derived patterns are selected, the input pattern analysis unit 104 extracts, from the selected registered patterns, a registered pattern with the highest degree of approximation to a derived pattern. Additionally, the process related to extraction of a registered pattern will be described later in detail. Information on the registered pattern extracted by the input pattern analysis unit 104 in this manner is input to the command execution unit 106.

When the information on the registered pattern is input, the command execution unit 106 reads information showing a correspondence relationship between each registered pattern and a command (hereinafter, command correspondence information) from the storage unit 108, and executes a command corresponding to the input registered pattern. The command here is a process command that is executed to realize a predetermined function.

For example, a format change command for realizing a function of changing the format of an input character string can be cited as an example. Also, a playback control command for video content or music content, an edit command for an image, an activation command for an application, a start command for locking, a release command for a lock, an enter command for an input character, an enlargement/reduction command for a display image, a generation command for a window, and the like may be cited as examples. In addition to the above, a command for realizing any function that can be provided by the information processing apparatus 100 is made the target of execution process by the command execution unit 106.

When a command is executed by the command execution unit 106, a control signal ordering update of the display screen, data for update, and the like are input to the display control unit 110. However, in the case a user's operation is locked, execution of some commands is prohibited by the lock processing unit 114. When the control signal, data related to display contents, and the like are input from the command execution unit 106 to the display control unit 110, the display control unit 110 updates the display contents displayed on the display unit 132 according to the input control signal.

For example, in the case a playback control command for video content is executed and a control signal ordering playback of video content is input, the display control unit 110 reads the data of the video content recorded in the storage unit 108 and displays a playback screen on the display unit 132. Also, in the case a display command for a menu is executed and a control signal ordering display of a menu is input, the display control unit 110 reads display objects of a menu recorded in the storage unit 108 and displays the same on the display unit 132.

Furthermore, the display control unit 110 has a function of managing a window displayed on the display unit 132. For example, in the case a generation command for a new window is executed and a control signal ordering generation of a new window is input, the display control unit 110 generates a new window on the display unit 132. If an activation command for a Web browser is executed at the same time, a control signal to the effect that an execution screen of the activated Web browser is to be displayed in the new window is input to the display control unit 110, and the execution screen of the Web browser is displayed in the new window generated on the display unit 132. At this time, the display control unit 110 acquires Web information from a network 10 via the communication unit 112, and displays the acquired Web information on the execution screen of the Web browser.

As described, the information processing apparatus 100 according to the present embodiment includes the touch panel 102 capable of detecting, at the time of being pressed with a plurality of fingers, the touch position and the pressure intensity of each finger, and includes a function of identifying a registered pattern based on the relative position and relative intensity between the touch positions. Also, the information processing apparatus 100 includes a function of executing a command associated with the registered pattern. Additionally, in the above explanation, only some of the commands are illustrated for the sake of explanation, but the types of commands to which the technology of the present embodiment is applicable are not limited to these. Furthermore, various modifications are possible also for the derivation method of an input pattern or the expression method of a registered pattern.

In the foregoing, the functional configuration of the information processing apparatus 100 according to the present embodiment has been described.

(1-1-3: Input Pattern Analysis Method)

Next, the extraction method for a registered pattern (analysis method for an input pattern) of the input pattern analysis unit 104 will be described in greater detail with reference to FIGS. 3A and 3B. FIGS. 3A and 3B are explanatory diagrams showing examples of an analysis method for an input pattern according to the present embodiment. Additionally, it is assumed that the registered pattern A (see FIG. 4A), the registered pattern B (see FIG. 4B), and a registered pattern C illustrated in FIG. 3B are stored in the storage unit 108.

As has been described, the input pattern analysis unit 104 extracts, based on the information on the touch positions A, B, and C detected by the touch position detection unit 134 and the information on the pressure intensities A, B, and C detected by the pressure detection unit 136, a registered pattern that is approximate to these pieces of information on the input pattern. At this time, the input pattern analysis unit 104 extracts a registered pattern that is approximate to the relative position of the touch positions A, B, and C and the relative intensity of the pressure intensities A, B, and C.

The information on the touch positions A, B, and C and the pressure intensities A, B, and C can be expressed as the input pattern ORG shown in FIG. 3A. Likewise, the information on the registered pattern taken as the comparison target can be expressed as the registered patterns A, B, and C shown in FIG. 3B. In fact, the image of the input pattern ORG can be generated based on the information on the touch positions A, B, and C and the pressure intensities A, B, and C. Also, the image of the input pattern ORG can also be directly generated based on the distribution of the pressure intensities obtained from the touch panel 102.

Now, extraction of a registered pattern that is executed by the input pattern analysis unit 104 corresponds to pattern matching between the input pattern ORG shown in FIG. 3A and the registered patterns A, B, and C shown in FIG. 3B. Moreover, the input pattern analysis unit 104 is to extract a registered pattern that is approximate to the relative position and the relative intensity of the input pattern ORG. That is, a registered pattern that is approximate to the input pattern ORG with respect to the positional relationship between the touch positions A, B, and C and the intensity relationship between the touch positions A, B, and C is extracted. Thus, as shown in FIG. 3A, a process corresponding to pattern matching with respect to the derived patterns A, B, and C of the input pattern ORG is performed.

The registered pattern A is the input pattern ORG rotated with the origin of the display screen as the centre. Even if the input pattern ORG is rotated, the positional relationship between the touch positions A, B, and C does not change. Also, the intensity relationship between the pressure intensities A, B, and C does not change because of the rotation of the input pattern ORG. Similarly, in the case the input pattern ORG is translated, the positional relationship between the touch positions A, B, and C and the intensity relationship between the pressure intensities A, B, and C do not change. Also, even if the pressure intensities A, B, and C are enlarged (uniformly multiplied by r; r is a positive real number), the ratio between the pressure intensities A, B, and C does not change.

Thus, the input pattern analysis unit 104 causes derivation from the input pattern ORG by enlargement, rotation, translation and the like, and extracts, from the registered patterns A, B, and C, one that is approximate to the derived patterns A, B, and C. In the examples of FIGS. 3A and 3B, the registered pattern A is extracted by the input pattern analysis unit 104.

First, the input pattern analysis unit 104 calculates the degree of approximation between each derived pattern and each registered pattern. For example, the input pattern analysis unit 104 calculates, for the derived pattern A, each of the degree of approximation to the registered pattern A, the degree of approximation to the registered pattern B, and the degree of approximation to the registered pattern C. The degree of approximation to each of the registered patterns A, B, and C is calculated likewise for the derived patterns B and C. Then, the input pattern analysis unit 104 selects a registered pattern with the highest degree of approximation.

Moreover, a method of weighting an evaluation of the degree of approximation according to the degree of derivation is also conceivable. For example, in the case of evaluating two candidates (combinations of registered pattern and derived pattern) whose difference regarding the degree of approximation is within a predetermined range, a method of selecting one whose degree of derivation of the derived pattern is low is conceivable. Particularly, with respect to pressure intensity-related derivation, it is preferable to take the degree of derivation into account. For example, a possibility that the difference between two black circles that were determined, before enlargement, to be of about the same pressure intensity is emphasized by the enlargement and that the pressure intensity is determined to be different is conceivable. When configured to select one with a lower degree of derivation in such a case, the determination accuracy is increased. Additionally, depending on an assumable case, configuration is also possible where one with a high degree of derivation is preferentially selected.

Now, the degree of approximation between patterns can be calculated by the amount of shift between corresponding touch positions at each touch position, the difference (absolute value) between the pressure intensities at each touch position, and the like. For example, the total values of the amount of shifts and the differences between the pressure intensities at respective touch positions are added, and the degree of approximation can be expressed by the inverse of the added value. Also, at the time of evaluating the degree of approximation, weighting may be performed at the time of totalling or addition according to, for example, whether emphasis is put on the shift between the touch positions or on the difference between the pressure intensities.

Furthermore, a process of excluding a registered pattern with small shift of touch positions but with a different ratio of pressure intensities from the selection targets may be performed. For example, with respect to a derived pattern according to which the pressure intensity of a finger 1 is "high," the pressure intensity of a finger 2 is "low," and the pressure intensity of a finger 3 is "high," the registered pattern A shown in FIG. 4A may be excluded from the selection target. In this manner, by narrowing down in advance the registered patterns to be included in the selection targets based on the information on the relative intensity, the amount of computation required for the extraction process of a pattern is reduced, and the load on the information processing apparatus 100 can be reduced.

In the foregoing, the extraction method of a registered pattern by the input pattern analysis unit 104 according to the present embodiment has been described.

(1-1-4: Operation Flow)

Next, an operation flow of the information processing apparatus 100 according to the present embodiment will be described with reference to FIG. 5. FIG. 5 is an explanatory diagram showing an operation flow of the information processing apparatus 100 according to the present embodiment. Additionally, the operation flow illustrated in FIG. 5 is configured focusing on the extraction process of a registered pattern, and description is omitted for other operations.

As shown in FIG. 5, first, input to the touch panel 102 using a plurality of fingers is performed by a user (S102). When such user input is performed, the information processing apparatus 100 detects a plurality of touch positions touched by the plurality of fingers, and grasps the relative relationship between the touch positions (relative position) (S104). Also, the information processing apparatus 100 detects the pressure intensities at the plurality of touch positions touched by the plurality of fingers, and grasps the relative relationship between the pressure intensities (relative intensity) (S106). That is, information on the derived patterns A, B, and C that are obtained by transforming the input pattern ORG is calculated in steps S104 and S106.

Next, the information processing apparatus 100 compares the derived patterns A, B, and C (information on the relative position and relative intensity) obtained in steps S104 and S106 with the registered patterns recorded in the storage unit 108 (S108), and determines whether a registered pattern that is approximate to the derived patterns A, B, and C exists or not (S110). In the case a registered pattern that is approximate does not exist, the information processing apparatus 100 ends the extraction process of a registered pattern. On the other hand, in the case a registered pattern that is approximate to the derived patterns is extracted, the information processing apparatus 100 proceeds to the process of step S112.

In step S112, the information processing apparatus 100 calculates the degree of approximation between the extracted registered pattern and a derived pattern, and determines whether or not the calculated degree of approximation is a predetermined value (threshold value) or higher (S112). In the case the degree of approximation is lower than the predetermined value, the information processing apparatus 100 proceeds again to the process of step S108 and attempts extraction of another registered pattern. On the other hand, in the case the degree of approximation is the predetermined value or higher, the information processing apparatus 100 proceeds to the process of step S114. In the case it has proceeded to the process of step S114, the information processing apparatus 100 executes a command corresponding to the registered pattern (S114), and ends the series of processes.

In the foregoing, the operation flow of the information processing apparatus 100 according to the present embodiment has been described. In the following, concrete embodiments will be introduced.

[1-2: Playback Control Method]

Figure 6A:
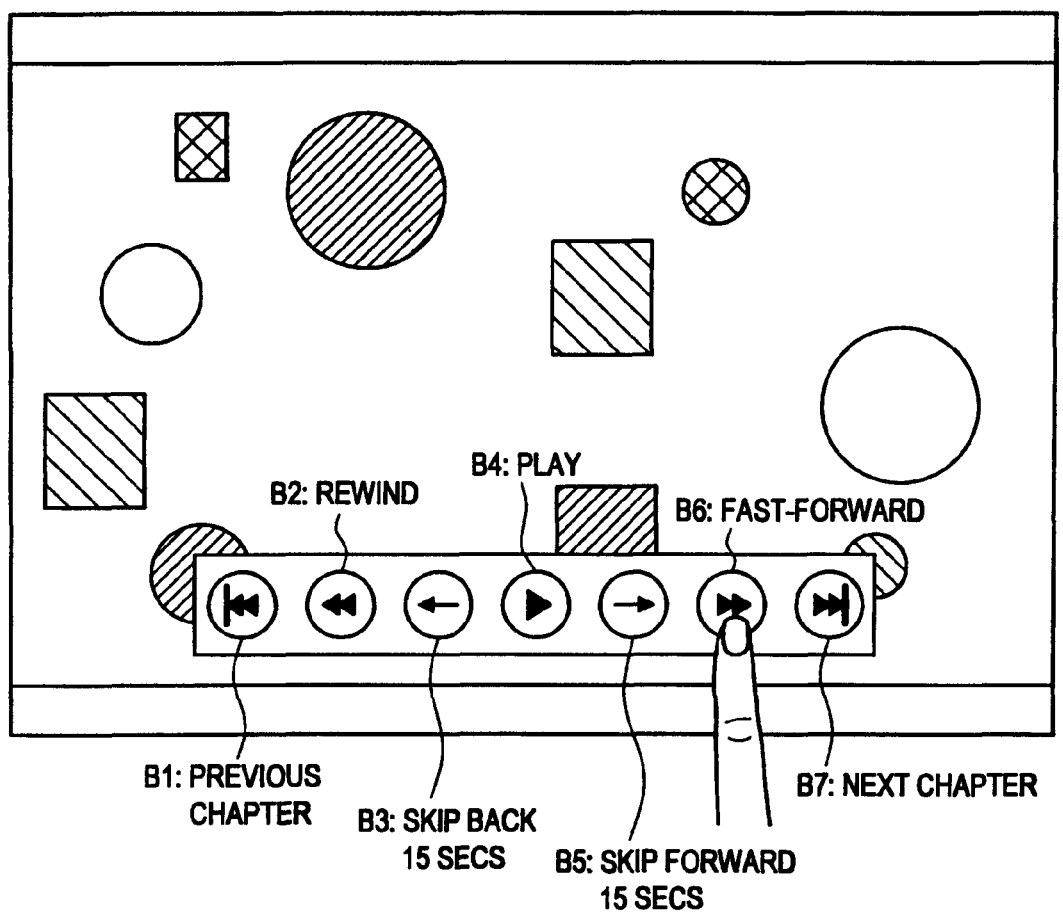
FIG. 6A is an explanatory diagram showing a general playback control method.
Figure 6B:
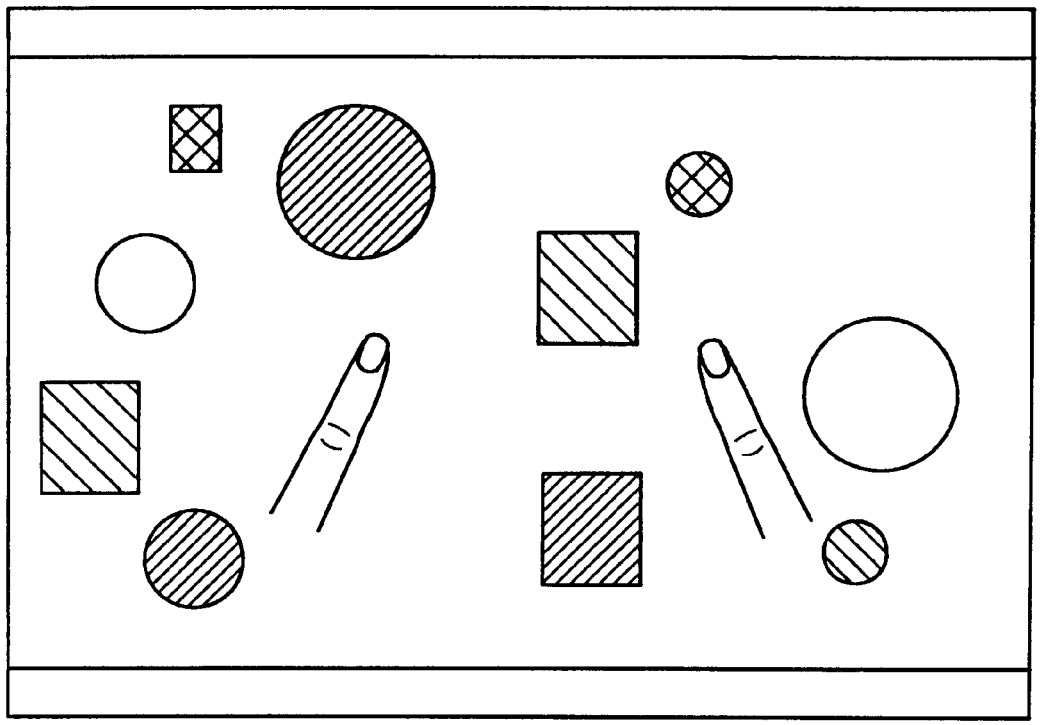
FIG. 6B is an explanatory diagram showing a playback control method according to the embodiment.
Figure 6C:
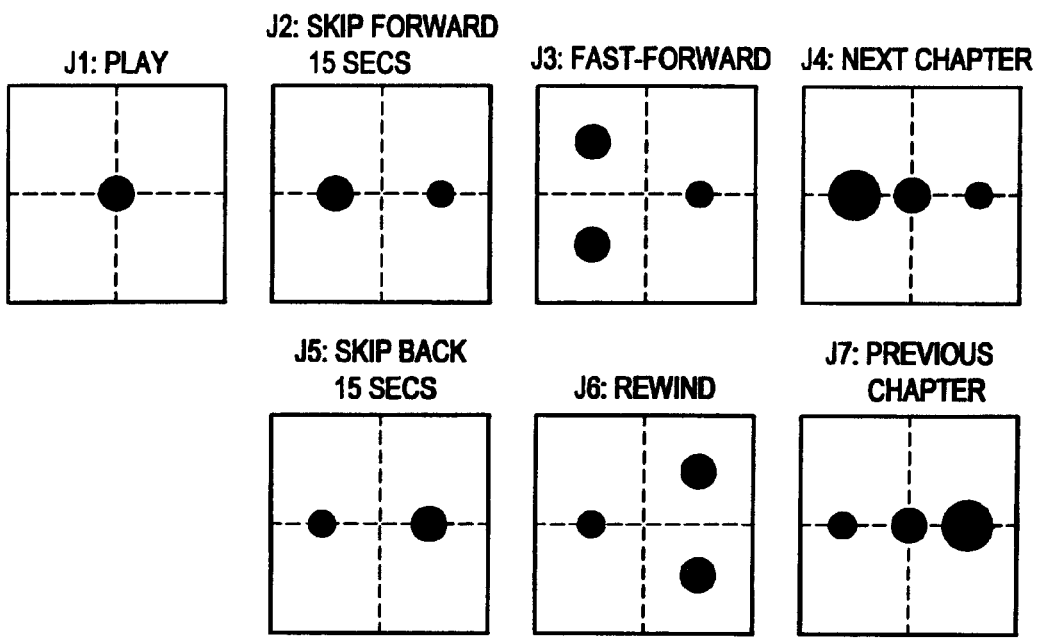
FIG. 6C is an explanatory diagram showing the playback control method according to the embodiment.

First, application to a content playback control method (embodiment 1) will be described with reference to FIGS. 6A, 6B, and 6C. FIG. 6A is an explanatory diagram showing a general playback control method. FIGS. 6B and 6C are explanatory diagrams showing the playback control method according to the present embodiment.

(1-2-1: Playback Control by Playback Button)

As shown in FIG. 6A, as a content playback control method, it is a general method to perform playback control by using playback control buttons (B1 to B7) displayed on a display screen. As the playback control buttons, there are a chapter movement button B1 for performing movement to the previous chapter, a rewind button B2 for performing rewind, and a short rewind button B3 for skipping back just 15 seconds, for example. Furthermore, a play button B4 for playing back content, a short skip button B5 for skipping forward just 15 seconds, a fast-forward button B6 for performing fast-forward, a chapter movement button B7 for moving to the next chapter, and the like are cited as examples.

Previously, a large number of playback control buttons B1 to B7 as shown in FIG. 6A were used as the input interface for performing content playback control. When a large number of playback control buttons B1 to B7 are displayed on the display screen in this manner, an effective display area is narrowed down. Also, a part of the content that is being played back may be hidden by the playback control buttons B1 to B7. Furthermore, at the time of performing a playback control operation, a user has to check the positions of the playback control buttons B1 to B7 and the function of each button and to touch the precise position a desired button is displayed. For these reasons, a general playback control method was not necessarily highly convenient to a user. Thus, application of the present embodiment to such a playback control method is considered.

(1-2-2: Playback Control according to Pressure Intensity Ratio)

As described above, the information processing apparatus 100 according to the present embodiment is provided with the touch panel 102 capable of detecting, at the time of being touched by a plurality of fingers, the touch positions and the pressure intensity at each touch position. Also, input patterns formed from the relative position and the relative intensity can be associated with commands, and commands to be executed can be switched according to an input pattern. Here, a method will be described according to which a function to be realized by each playback control button shown in FIG. 6A is assigned to an input pattern and a playback control operation is realized according to an input pattern. Therefore, the conceivable commands here are seven types, namely, a playback command, a command for skipping forward 15 seconds, a fast-forward command, a command for moving to the next chapter, a command for skipping back 15 seconds, a rewind command, and a command for moving to the previous chapter.

An input operation of a user is realized by touch using a plurality of fingers, as shown in FIG. 6B. However, although not expressed in FIG. 6B, a user has to appropriately adjust the pressure intensity of each finger according to the type of a command desired to be executed. However, unlike pressing with a specific strength, it is only an adjustment of relative strength of touching fingers, and it is comparatively easy to appropriately adjust the pressure intensity of each finger. Furthermore, the user has to appropriately adjust the positional relationship of the fingers according to the type of a command desired to be executed. However, unlike touching on a specific area within the display screen, it is only an adjustment of the positional relationship of one's fingers, and it is comparatively easy to appropriately adjust the positional relationship of the fingers.

Now, each playback control command described above is assigned to an input pattern as shown in FIG. 6C, for example. Additionally, in this example, the direction of placement of the display screen at the time of viewing the playback content is normally fixed, and great rotation is not allowed at the time of the extraction process of a registered pattern. Accordingly, expressions, "horizontal," "vertical," "left," "right," and the like, relative to the direction of placement of the display screen at the time of content playback will be used.

In the example of FIG. 6C, the playback command is assigned to an input pattern J1 of pressing the centre with one finger. Also, the command for skipping forward 15 seconds is assigned to an input pattern J2 of using two horizontally aligned fingers and pressing down the left finger relatively strongly and pressing down the right finger relatively weakly. In contrast, a command for skipping back 15 seconds is assigned to an input pattern J5 of using two horizontally aligned fingers and pressing down the left finger relatively weakly and pressing down the right finger relatively strongly.

Furthermore, an input pattern J3 of using three fingers is assigned to the fast forward command. According to the input pattern J3, two fingers are placed on the left and one finger is placed on the right. The two fingers placed on the left are placed in a vertical alignment. Also, the one finger placed on the right is placed at a position vertically higher than one of the two fingers placed on the left and at a position vertically lower than the other. Furthermore, it is configured such that the two fingers placed on the left are pressed down with about the same strength and the one finger placed on the right is pressed down more weakly than the two fingers placed on the left.

Furthermore, an input pattern J6 of using three fingers is assigned to the rewind command. According to the input pattern J6, two fingers are placed on the right and one finger is placed on the left. The two fingers placed on the right are placed in a vertical alignment. Also, the one finger placed on the left is placed at a position vertically higher than one of the two fingers placed on the right and at a position vertically lower than the other. Furthermore, it is configured such that the two fingers placed on the right are pressed down with about the same strength and the one finger placed on the left is pressed down more weakly than the two fingers placed on the right.

Furthermore, an input pattern J4 of using three fingers is assigned to the command for moving to the next chapter. According to the input pattern J4, three fingers are horizontally placed, and pressing is performed with strengths, strong, medium, and weak in order from the left. Similarly, an input pattern J7 of using three fingers is assigned to the command for moving to the previous chapter. According to the input pattern J7, three fingers are horizontally placed, and pressing is performed with strengths, strong, medium, and weak in order from the right.

The input patterns J1 to J7 are defined in this manner by the relative position and the relative intensity. Also, in addition to the relative position and the relative intensity, the number of touching fingers is changed according to the type of command. Furthermore, in the example of FIG. 6C, the combination of the relative position and the relative intensity is elaborated so that a user can easily recall the form of an input pattern based on the contents of a command.

For example, the input patterns J2 and J5 are configured with the same relative position and different relative intensities. The command for skipping forward 15 seconds and the command for skipping back 15 seconds match each other in that the scene is moved by just 15 seconds but are different in the direction of movement. Accordingly, by expressing the matching aspect by commonising the relative position and expressing the different aspect by the difference in the relative intensity, a user is enabled to easily recall the input patterns J2 and J5 at the time of executing the command for skipping forward 15 seconds and the command for skipping back 15 seconds. Additionally, the pairs, the input patterns J3 and J6 and the input patterns J4 and J7, have forms where the finger(s) to be placed on the left and the finger(s) to be placed on the right are interchanged.

Of course, the input patterns J1 to J7 shown in FIG. 6C are examples, and the playback control commands can be assigned to other input patterns. Moreover, as can be seen from the example of FIG. 6C, in the present embodiment, an input pattern is expressed by combining three elements, namely, the relative position, the relative intensity, and the number of fingers, and thus a large number of commands can be assigned to the input patterns. Also, as in the example of FIG. 6C, by elaborating the form of the input pattern, an input pattern that a user can easily memorise and recall according to the type of a command can be defined. As a result, the convenience of the user can be greatly improved.

In the foregoing, application to the content playback control method (embodiment 1) has been described.

[1-3: Lock-Release Method]

Next, application to a lock-release method (embodiment 2) will be described with reference to FIGS. 7A, 7B, 7C, and 7D.

Figure 7A:
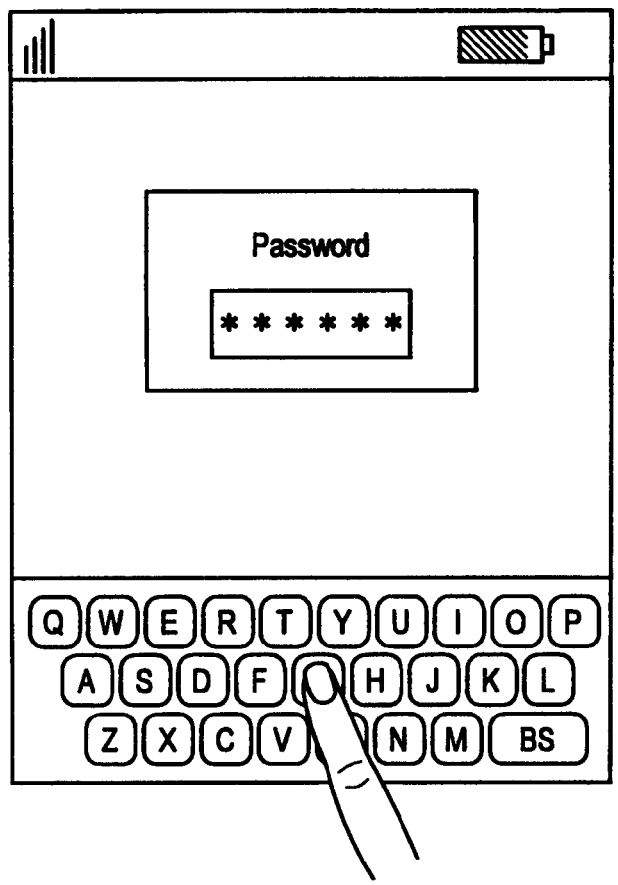
FIG. 7A is an explanatory diagram showing a general lock-release method.
Figure 7B:
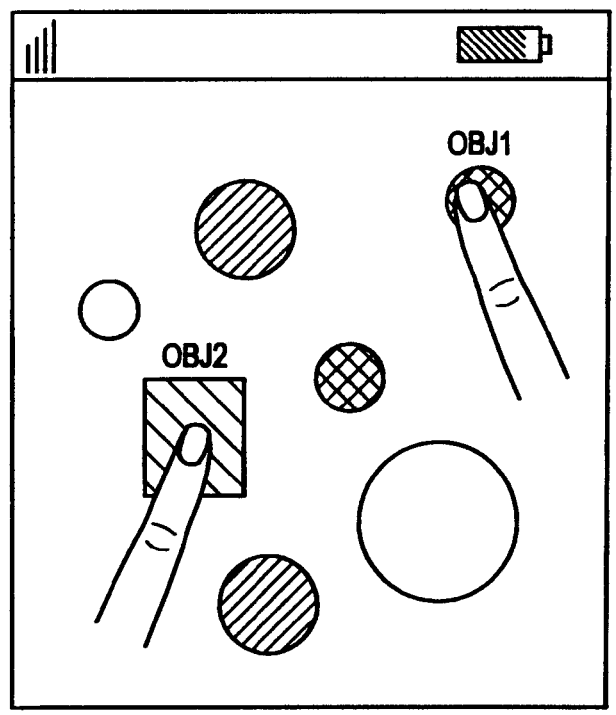
FIG. 7B is an explanatory diagram showing a general lock-release method.

FIGS. 7A and 7B are explanatory diagrams showing general lock-release methods. FIGS. 7C and 7D are explanatory diagrams showing lock-release methods according to the present embodiment. Additionally, lock here means the function of restricting a user's input operation. For example, when in a lock state, all the user operations except for the operation of releasing the lock are disabled. Transition to the lock state is performed in a case a non-operation state continued for a specific period of time or in a case a predetermined lock-start operation is performed by a user, for example.

(1-3-1: Lock-Release by Password Input)

As a lock-release method of the lock state, there is a method based on password input as shown in FIG. 7A, for example. This method is adopted by many general information processing apparatuses. In the example of FIG. 7A, when an input operation is performed by a user in the lock state, an input box for inputting a password is displayed together with a message prompting input of the password. Then, when a correct password is input in this input box, the lock is released. Of course, if the input password is incorrect, the lock state is maintained.

In this manner, in the example of FIG. 7A, only the user who knows the correct password can release the lock. Thus, by appropriately using the lock, illegal operation by a malicious third party can be prevented, or information can be hidden from other users. However, in the example of FIG. 7A, there is a possibility that the password is secretly observed by a third party while the user is inputting the password. Of course, the password is not displayed in the input box, but the password is revealed when the hand is secretly observed during input.

In the case of an ATM (Automated Teller Machine) installed in a banking facility or the like, a partition is provided between ATMs so that the hand inputting the password will not be secretly observed or attention is paid so that a third party will not approach a person operating the ATM. However, for an information processing apparatus possessed by an individual, such as a mobile phone or a portable information terminal, measures applied to the ATM would be excessive, and realization is difficult in reality. Furthermore, in the case of using such an information processing apparatus, a third party is often present near the operating person, and the input operation of a password is often performed without having the third party step away. Accordingly, the method of releasing a lock by password input as shown in FIG. 7A cannot be said to be sufficiently secure.

(1-3-2: Lock-Release according to Touch Position)

As a lock-release method different from the method based on password input, there is a method based on multi-touch input as shown in FIG. 7B, for example. This method is adopted, in some cases, by a general small information processing apparatus provided with a touch panel. In the example of FIG. 7B, the lock is released when two objects, OBJ1 and OBJ2, among a plurality of objects displayed in a lock state are touched by the user. Since a third party does not know which objects to touch, a combination of touch positions plays the same role as the password described above. That is, a combination of the number of objects to be touched at the same time, the types of the objects, and the positions of the objects will be the key for releasing the lock.

Furthermore, the method based on multi-touch takes less time to input an operation compared to the method based on password input. In the case of password input, characters are selected on the keyboard and are input one by one, but in the case of multi-touch input, the touch panel has to be touched only once by a plurality of fingers. Thus, by paying attention to the surroundings only for a moment, checking that no third party is watching and swiftly performing the input operation, it is seldom that the touch operation is secretly observed. However, since the contents of the operation are simple, if the instant of touching is seen by a third party by accident, the operation will be easily remembered. Accordingly, the method of releasing a lock by multi-touch input as shown in FIG. 7B cannot be said to be sufficiently secure.

(1-3-3: Lock-Release According to Pressure Intensity Ratio)

Accordingly, in the present embodiment, a lock-release method that uses pressure intensity is proposed. Since the method based on multi-touch described above takes a combination of touch positions as a key, the key is easily visually perceived. Thus, when a third party looks at the touch positions at the time of key input, the key can be easily perceived by the third party. However, the lock-release method proposed in the present embodiment uses pressure intensity which will not be visually distinguished by appearance, and thus the key is not easily distinguished even if the third party is looking at the hand at the time of key input.

To realize such a lock-release method, a registered pattern for lock-release (hereinafter, lock-release pattern) is registered in advance in the storage unit 108 of the information processing apparatus 100 (see FIG. 2) according to the present embodiment. Additionally, the lock-release pattern is different from other registered patterns provided for command execution in that it is authentication information for releasing a lock. However, the structure itself of the lock-release pattern is the same as other registered patterns shown in FIGS. 4A, 4B, and the like. In the following, an operation of the information processing apparatus 100 regarding lock-release will be briefly described.

First, when the touch panel 102 is touched by a user to release a lock, the touch positions are detected by the touch position detection unit 134. Also, the pressure at each touch position is detected by the pressure detection unit 136. Information on the touch positions detected by the touch position detection unit 134 and information on the pressures detected by the pressure detection unit 136 are input to the input pattern analysis unit 104. When the information on the touch positions and pressures is input, the input pattern analysis unit 104 reads information on the lock-release pattern from the storage unit 108, and compares the same with the information on the touch positions and pressures which has been input.

At this time, the input pattern analysis unit 104 grasps the relative position and the relative intensity from the information on the touch positions and pressures which has been input, and compares the input pattern and the lock-release pattern. In the configuration described above, transformation, such as enlargement, rotation, translation or the like, was applied to the input pattern and a derived pattern was generated, and then the derived pattern and the registered pattern were compared. However, regarding comparison with the lock-release pattern, derivation from the input pattern by rotation is not allowed, as shown in FIG. 7C, and derived patterns generated by enlargement and translation are compared with the lock-release pattern. Of course, rotation may also be permitted, but fixing the input direction will add the input direction to the key, thereby further increasing the security.

According to such a configuration, as shown in FIG. 7C, an input pattern A input with a correct input direction and the lock-release pattern will be approximate, and an input pattern B input with a different input direction and the lock-release pattern will not be approximate. Accordingly, although they have the same form, the lock will be released when the input pattern A is input and the lock will not be released when the input pattern B is input. Additionally, to increase the accuracy of pattern matching, a configuration is also possible where rotation by a predetermined value or less is permitted. For example, if the predetermined value is set based on an angle at which tilting occurs with ease when the finger is tilted left or right with the wrist fixed (for example, about 5 to 10 (deg.)), the perception accuracy can be increased without losing the information on the input direction.

Furthermore, as shown in FIG. 7D, when using the dynamic range of a pressure, the security can be further increased. As has been described, the input pattern analysis unit 104 compares patterns based on the relative intensity. That is, the input pattern analysis unit 104 compares, with a registered pattern, a derived pattern obtained by uniformly multiplying the pressures at respective touch positions by N (enlargement). However, the strength of a pressure is different for each person. For example, the average pressure is considered to be weaker for women compared to men. Also, there are some whose difference between the pressure at the time of strong press-down and the pressure at the time of weak press-down is large and there are others whose difference is small. Such a difference appears as the difference in the dynamic range of a pressure detected by the pressure detection unit 136.

In FIG. 7D, a configuration with a narrow dynamic range and a configuration with a wide dynamic range are illustrated in comparison with each other. The range of the dynamic range is determined based on the distribution of the pressures detected by the pressure detection unit 136 in advance at the time an operation was performed by a user. Furthermore, if outside the dynamic range determined in advance, a lock is not released even with the correct input pattern. With such a configuration, comparison of the input pattern and the lock-release pattern can be performed taking into account the difference between individuals regarding the dynamic range. As a result, even if the combination of the touch positions and the combination of pressures are perceived by a third party, the probability of the third party being able to release the lock can be reduced. Thus, the security is remarkably increased.

In the foregoing, the lock-release method according to the present embodiment has been described. Comparison of the input pattern and the lock-release pattern according to the lock-release method described above is performed by the input pattern analysis unit 104. When the comparison process by the input pattern analysis unit 104 is complete, the result of the comparison is input to the command execution unit 106. As a result of the comparison, if the input pattern and the lock-release pattern match with a sufficient accuracy and release of the lock is allowed, the command execution unit 106 executes the lock-release command and causes the lock processing unit 114 to release the lock. On the other hand, if release of the lock is denied, the command execution unit 106 inputs to the display control unit 110 a control signal for causing the display unit 132 to display an authentication error, for example. The lock-release process is performed in this manner by the information processing apparatus 100.

[1-4: Display Size Control Method]

Next, application to a map application (embodiment 3) will be described with reference to FIG. 8. Additionally, although a map application is taken as an example here for the sake of explanation, the application scope of the present embodiment is not limited to such, and application is similarly possible to any application capable of enlarging or reducing an image. Moreover, the black circles in FIG. 8 indicate the magnitude of pressures, and it is indicated that the larger the radius, the higher the pressure.

As described above, the information processing apparatus 100 according to the present embodiment is capable of detecting the relative intensity. Thus, a consideration has been given on an application by which enlargement or reduction of an image is realized by changing the number of fingers with high pressure intensity. For example, as shown in FIG. 8, it is possible to realize an operating system where the touch panel 102 is touched with three fingers, and slight enlargement is performed when one finger strongly presses down and great enlargement is performed when two fingers strongly press down. Also, a configuration is possible where, when the force of a strongly pressing finger is relaxed and the pressure is lowered, the scale of the enlarged image is reduced.

Furthermore, depending on the number of touching fingers, it is also possible to change the enlargement rate or the reduction rate of enlargement or reduction by the pressure change of one finger. For example, in the case the number of the touching fingers is N (N≥2), the enlargement rate is set such that the minimum image size can be enlarged to the maximum image size by N−1 steps. In the example of FIG. 8, the minimum image size can be enlarged to the maximum image size by two steps. The reason the enlargement rate is not set here such that enlargement to the maximum image size is achieved by N steps is that it is difficult to distinguish between a case where all the fingers are in a state of low pressure intensity and a case where all the fingers are in a state of high pressure intensity In the case the N fingers are of the same pressure intensity, the relative intensity will be the same regardless of whether the press-down is strong or weak. Thus, to distinguish between them, it is necessary to compare the absolute values of the pressure. Accordingly, in the case of setting the enlargement rate such that enlargement to the maximum image size is achieved by N steps, it is well to configure such that the values of the pressure intensity detected in the cases where all the fingers are of the same pressure intensity are compared and determination is made according to the degree of intensity as to whether it is enlargement or reduction. In this manner, by applying the technology of the present embodiment, an enlargement/reduction operation of an image can be performed more intuitively. Such a mechanism produces a remarkable effect in a situation where a user is not allowed to concentrate on image operation, as with a car navigation system or the like.

In the foregoing, the first embodiment of the present invention has been described.

2. Second Embodiment

Next, a second embodiment of the present invention will be described. The main difference between the present embodiment and the first embodiment described above lies in the configuration of the touch panel. In the first embodiment described above, the pressure detection unit 136 for detecting the strength of a pressure was provided as means for detecting pressure intensity. However, the pressure intensity can be detected without actually measuring the pressure. For example, the pressure intensity can be obtained also by using an optical touch panel configured from a light source provided within a display screen (for example, a backlight or the like) and an optical sensor. The present embodiment uses such an optical touch panel.

[2-1: Configuration of Information Processing Apparatus 200]

First, the functional configuration of an information processing apparatus 200 according to the present embodiment will be described with reference to FIG. 9. FIG. 9 is an explanatory diagram showing an example functional configuration of the information processing apparatus 200 according to the present embodiment. Additionally, the function of the information processing apparatus 200 illustrated in FIG. 9 can be realized by the hardware configuration illustrated in FIG. 11. Furthermore, the structural elements having substantially the same functions as the information processing apparatus 100 according to the first embodiment described above are denoted with the same reference signs, and detailed explanation is omitted.

Figure 9:
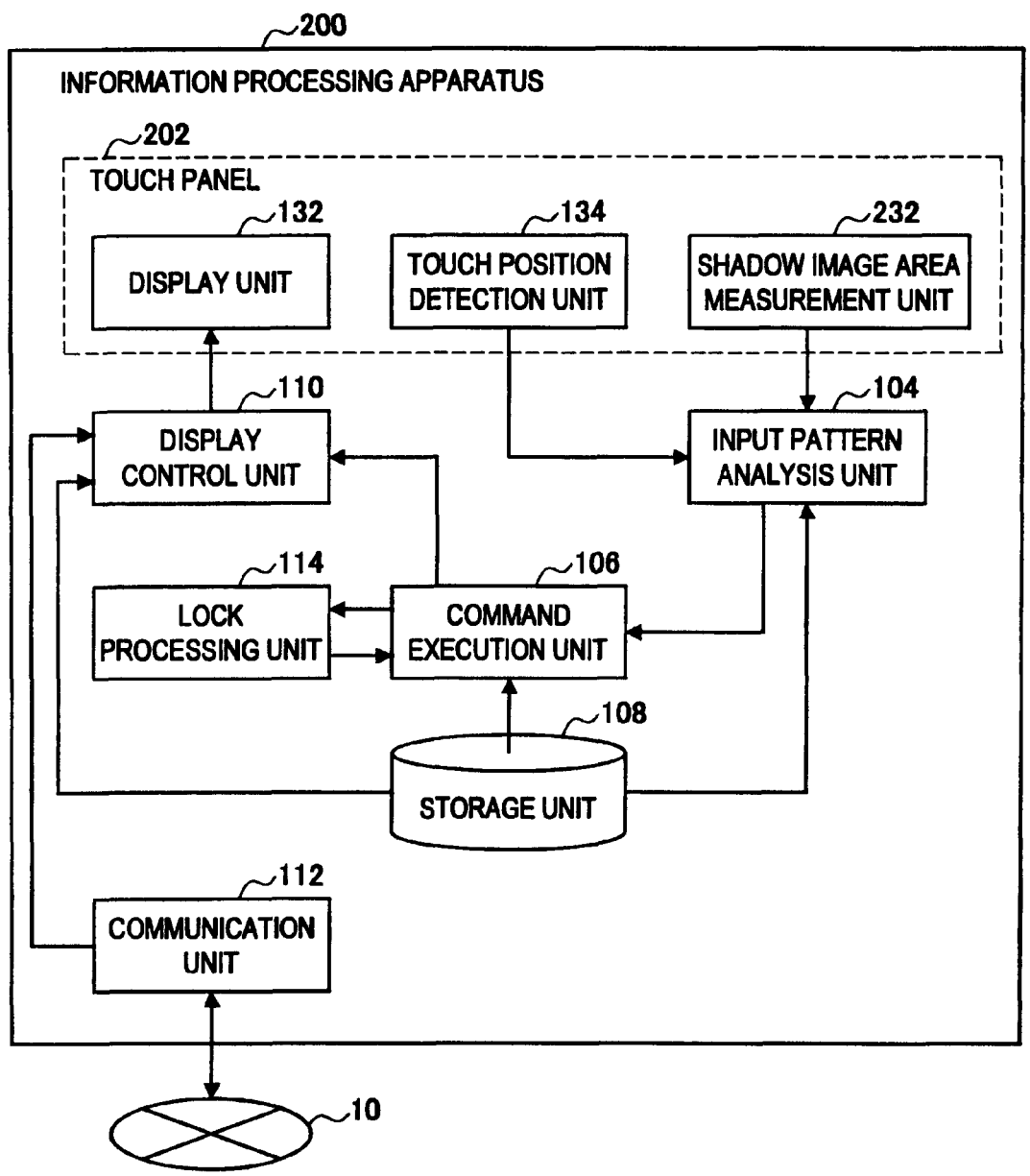
FIG. 9 is an explanatory diagram showing an example functional configuration of an information processing apparatus according to a second embodiment of the present invention.

As shown in FIG. 9, the information processing apparatus 200 is configured mainly from a touch panel 202, an input pattern analysis unit 104, a command execution unit 106, a storage unit 108, a display control unit 110, a communication unit 112, and a lock processing unit 114. As described, the difference to the information processing apparatus 100 according to the first embodiment described above lies mainly in the configuration of the touch panel 202. Accordingly, explanation will be given mainly on the configuration of the touch panel 202.

As shown in FIG. 9, the touch panel 202 includes a display unit 132, a touch position detection unit 134, and a shadow image area measurement unit 232. Detection means of the touch panel 202 for pressure intensity is the shadow image area measurement unit 232. The touch panel 202 is an optical touch panel. Additionally, it is assumed that a light source for emitting light from within the display screen and an optical sensor for detecting light entering from the surface of the display screen are included in the touch panel 202.

In the case a finger is touching the display screen, part of the light emitted from the light source is reflected by the finger and enters the optical sensor. Also, light not reflected by the finger is not received by the optical sensor. Accordingly, by forming an image from the distribution of light which has entered the optical sensor, the shape of the finger pressing the surface of the touch panel 202 is obtained as an image.

Figure 10:
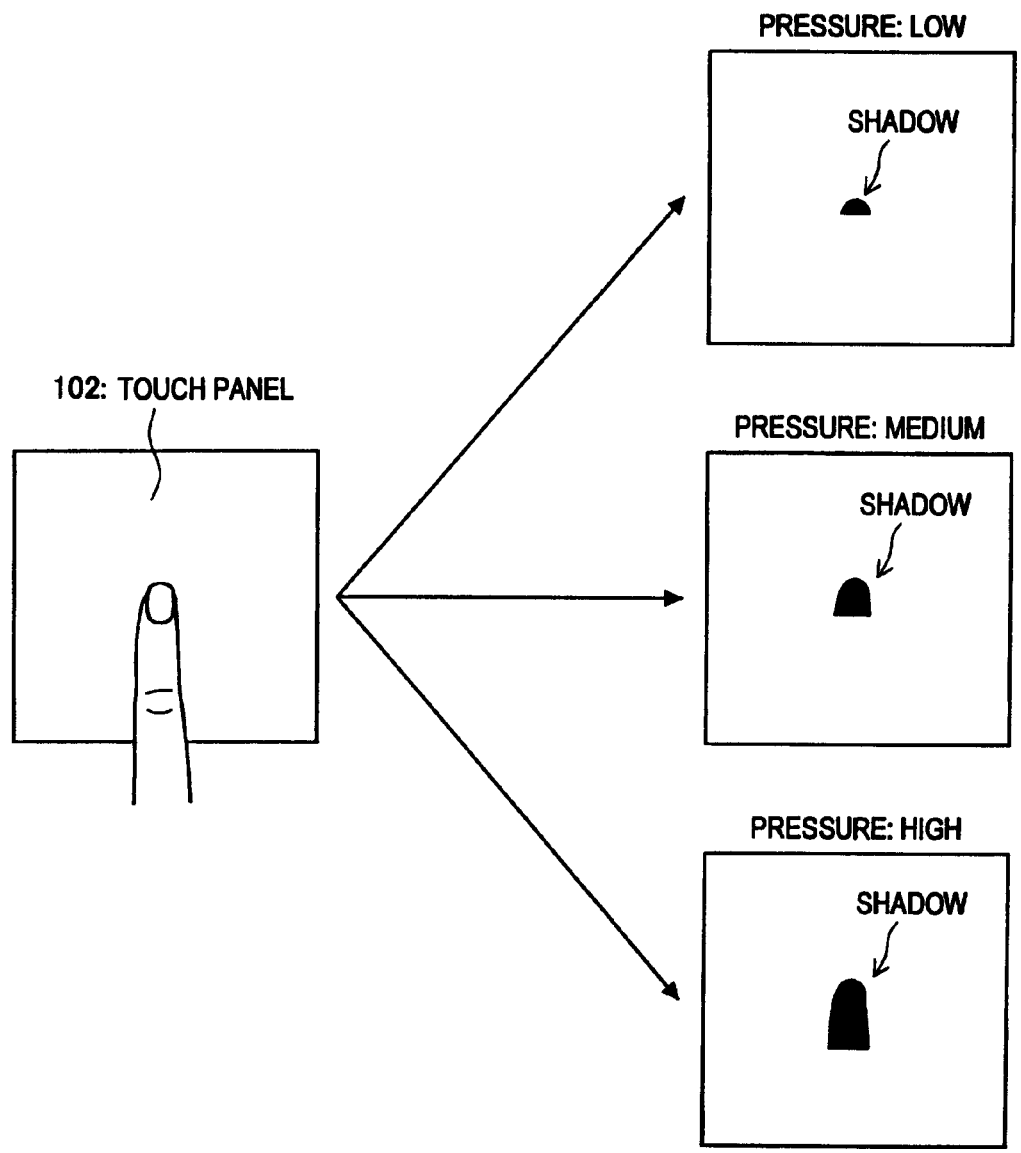
FIG. 10 is an explanatory diagram showing a part of the operation of a shadow image area measurement unit included in the information processing apparatus according to the embodiment.

For example, when a part where the intensity of the reflected light is strong is expressed as a shadow, image patterns as shown in FIG. 10 are obtained. A small shadow is obtained at a part which is weakly pressed, and since the finger is more pressed against the touch panel 202 as the pressure becomes higher, the area of the shadow gradually becomes larger. Thus, the pressure intensity at each touch position can be detected by measuring the area of the shadow. A plurality of shadows corresponding to a plurality of fingers are obtained in the case of multi-touch, and the pressure intensity of each finger is obtained by measuring the area of each seal.

Thus, the touch position detection unit 134 detects the position where a shadow is obtained as the touch position, and inputs the detection result to the input pattern analysis unit 104. Furthermore, the shadow image area measurement unit 232 acquires the area of each shadow, and inputs the size of the area to the input pattern analysis unit 104 as information on the pressure intensity. In this manner, information on the touch position and information on the pressure intensity are input to the input pattern analysis unit 104. Thus, matching of an input pattern and a registered pattern can be performed as in the first embodiment described above.

Additionally, a configuration is also possible where the image itself which includes the shadow is input to the input pattern analysis unit 104 as an input pattern. In this case, pattern matching between an input pattern and registered patterns is performed by image processing, and a registered pattern that is approximate to the input pattern can be extracted. At this time, a derived pattern is generated from the input pattern, and pattern matching between the derived pattern and the registered patterns is performed. Additionally, the process in the latter stage of the input pattern analysis unit 104 is the same as the first embodiment, and description is omitted.

In the foregoing, the second embodiment of the present invention has been described.

3: Example Hardware Configuration

Figure 11:
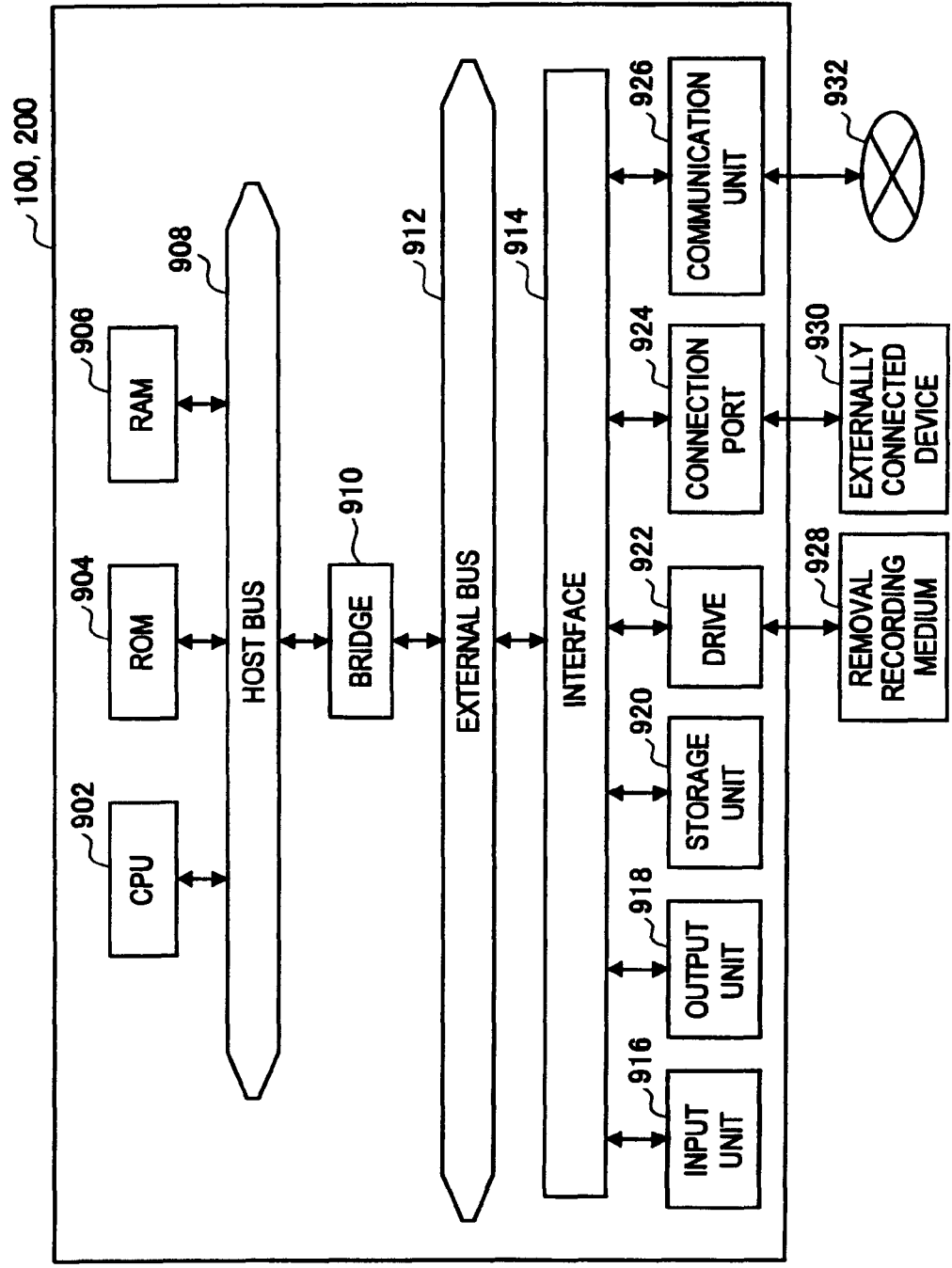
FIG. 11 is an explanatory diagram showing an example hardware configuration of the information processing apparatus according to each embodiment of the present invention.

The function of each structural element of the information processing apparatuses 100 and 200 described above can be realized by using the hardware configuration of an information processing apparatus shown in FIG. 11, for example. That is, the function of each structural element is realized by controlling the hardware shown in FIG. 11 by using a computer program. Additionally, the mode of this hardware is arbitrary, and may be a personal computer, a portable information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 11, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory The CPU 902 functions as an arithmetic processing unit or a control unit, for example, and controls an entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an IC card on which a non-contact IC chip is mounted or an electronic device. The IC is an abbreviation for Integrated Circuit.

The connection port 924 is a port such as a port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

4. Summary

Lastly, the technical contents according to the first and second embodiments of the present invention will be briefly described. The technical contents stated here can be applied to various information processing apparatuses, such as a personal computer, a mobile phone, a portable game machine, a portable information terminal, an information appliance, a car navigation system, and the like.

The functional configuration of the information processing apparatus described above can be expressed as follows. The information processing apparatus includes a position detection unit for detecting positions of a plurality of operating tools pressing a screen, a pressure intensity detection unit for detecting pressure intensity of each of the operating tools, a storage unit having recorded thereon predetermined relative information indicating a relative position and a pressure intensity ratio between operating tools, a relative information detection unit for detecting the predetermined relative information that is approximate to the relative position between operating tools obtained from information on the positions detected by the position detection unit and the pressure intensity ratio between operating tools obtained from information on the pressure intensity detected by the pressure intensity detection unit, and a function providing unit for providing a predetermined function corresponding to the predetermined relative information detected by the relative information detection unit.

As described, the information processing apparatus is capable of detecting touch positions of a plurality of operating tools and pressure intensity of each operating tool. Also, the information processing apparatus holds predetermined relative information indicating a relative position and a pressure intensity ratio (relative intensity) between operating tools, and is capable of detecting the predetermined relative information that is approximate to the relative position and the pressure intensity ratio between operating tools that are obtained when a touch operation is performed by a plurality of operating tools. Furthermore, the information processing apparatus is capable of providing a predetermined function corresponding to the detected predetermined relative information. With such a configuration, a function can be assigned to a combination of a relative position and a pressure intensity ratio, and a large number of functions can be realized by a comparatively simple touch operations using multi-touch.

(Notes)

The touch position detection unit 134 is an example of a position detection unit. The pressure detection unit 136 and the shadow image area measurement unit 232 are examples of a pressure intensity detection unit. The input pattern analysis unit 104 is an example of a relative information detection unit. The command execution unit 106, the lock processing unit 114, the display control unit 110, and the communication unit 112 are examples of a function providing unit. A finger, a stylus and the like are examples of an operating tool. The registered pattern and the information thereon are examples of predetermined relative information. The touch panel 202 is an example of an imaging unit. The input pattern analysis unit 104 is an example of a pattern image detection unit. The pressure detection unit 136 is an example of a pressure sensor.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

The present invention can be applied to an information processing apparatus, an information processing method, and a program.

REFERENCE SIGNS LIST

100, 200 Information processing apparatus
102, 202 Touch panel
104 Input pattern analysis unit
106 Command execution unit
108 Storage unit
110 Display control unit
112 Communication unit
114 Lock processing unit
132 Display unit
134 Touch position detection unit
136 Pressure detection unit
232 Shadow image area measurement unit
APP Execution screen
KEY Software keyboard

The invention claimed is:

1. An information processing apparatus comprising:
a position detection unit for detecting positions of a plurality of operating tools pressing a screen;
a pressure intensity detection unit for detecting pressure intensity of each of the operating tools;
a storage unit having recorded thereon predetermined relative information indicating a relative position and a pressure intensity ratio between operating tools;
a relative information detection unit for detecting the predetermined relative information that is approximate to the relative position between operating tools obtained from information on the positions detected by the position detection unit and the pressure intensity ratio between operating tools obtained from information on the pressure intensity detected by the pressure intensity detection unit; and
a function providing unit for providing a predetermined function corresponding to the predetermined relative information detected by the relative information detection unit.

2. The information processing apparatus according to claim 1,
wherein the storage unit has stored thereon
coordinate information indicating, as the predetermined relative information indicating the relative position between operating tools, position coordinates of each of the operating tools, and
intensity information indicating, as the predetermined relative information indicating the pressure intensity ratio between operating tools, the pressure intensity of each of the operating tools, and
wherein the relative information detection unit
detects the coordinate information that is approximate by applying common translation/rotation operation to the position coordinates of each of the operating tools detected as the information on the positions by the position detection unit, and
detects the intensity information that is approximate by increasing or decreasing, at a same rate, the pressure intensity of each of the operating tools detected as the information on the pressure intensity by the pressure intensity detection unit.

3. The information processing apparatus according to claim 2,
wherein the storage unit has recorded thereon the predetermined relative information for release of a lock state in which a user operation is locked,
wherein the relative information detection unit detects the relative information, recorded on the storage unit for release of the lock state, that is approximate to the relative position between operating tools obtained from the information on the positions detected by the position detection unit while in the lock state and the pressure intensity ratio between operating tools obtained from the information on the pressure intensity detected by the pressure intensity detection unit while in the lock state, and
wherein the function providing unit releases the lock state in a case the relative information recorded on the storage unit for release of the lock state is detected by the relative information detection unit.

4. The information processing apparatus according to claim 3,
wherein, when in the lock state, the relative information detection unit detects the coordinate information that is approximate by applying only the common translation to the position coordinates of each of the operating tools detected as the information on the positions by the position detection unit.

5. The information processing apparatus according to claim 4,
wherein, when in the lock state, the relative information detection unit detects the intensity information that is approximate by increasing or decreasing, at a rate not exceeding a predetermined value, the pressure intensity of each of the operating tools detected as the information on the pressure intensity by the pressure intensity detection unit.

6. The information processing apparatus according to claim 2,
    wherein the storage unit has recorded thereon the predetermined relative information that is associated with a playback control function for performing playback control of content, and
    wherein the function providing unit provides the playback control function corresponding to the predetermined relative information detected by the relative information detection unit.

7. The information processing apparatus according to claim 1, further comprising:
    a light source for emitting light from within the screen; and
    an optical sensor capable of detecting intensity of light reflected by an operating tool pressing the screen when light is emitted from the light source,
    wherein the pressure intensity detection unit detects an area of the operating tool that strongly reflected the light emitted from the light source based on the intensity of light detected by the optical sensor, and detects the pressure intensity based on a size of the area.

8. The information processing apparatus according to claim 1, further comprising:
    a pressure sensor, on the screen, capable of detecting pressure,
    wherein the pressure intensity detection unit detects the pressure intensity of the operating tool based on a magnitude of the pressure detected by the pressure sensor.

9. An information processing apparatus comprising:
    a light source for emitting light from within a screen to outside;
    an imaging unit for capturing an image of an operating tool pressing the screen by forming an image from light that is reflected by the operating tool pressing the screen in a case light is emitted from the light source; and
    a pattern image detection unit for detecting, from pattern images prepared in advance, a predetermined pattern image that is approximate to the image of the operating tool captured by the imaging unit,
    wherein, in a case the screen is pressed by a plurality of operating tools and images of the operating tools are captured by the imaging unit, the pattern image detection unit detects a predetermined pattern image to which a relative position of each of the operating tools included in the image captured by the imaging unit and a size ratio between each of the operating tools are approximate.

10. An information processing method comprising:
    detecting positions of a plurality of operating tools pressing a screen;
    detecting pressure intensity of each of the operating tools;
    detecting predetermined relative information, indicating a relative position and a pressure intensity ratio between operating tools, that is approximate to a relative position between the operating tools obtained from information on the positions detected in the step of detecting positions and a pressure intensity ratio between the operating tools obtained from information on the pressure intensity detected in the step of detecting pressure intensity; and
    providing a predetermined function corresponding to the predetermined relative information detected in the step of detecting predetermined relative information.

11. An information processing method comprising:
    capturing, in a case light emitted from within a screen to outside is reflected by an operating tool pressing the screen, an image of the operating tool pressing the screen by forming an image from the reflected light; and
    detecting, from pattern images prepared in advance, a predetermined pattern image that is approximate to the image of the operating tool captured in the step of capturing,
    wherein, in a case the screen is pressed by a plurality of operating tools and images of the operating tools are captured in the step of capturing, a predetermined pattern image to which a relative position of each of the operating tools included in the image captured in the step of capturing and a size ratio between each of the operating tools are approximate is detected in the step of detecting.

12. A non-transitory computer readable medium storing a program for causing a computer to realize:
    a position detection function of detecting positions of a plurality of operating tools pressing a screen;
    a pressure intensity detection function of detecting pressure intensity of each of the operating tools;
    a relative information detection function of detecting predetermined relative information, indicating a relative position and a pressure intensity ratio between operating tools, that is approximate to a relative position between the operating tools obtained from information on the positions detected by the position detection function and a pressure intensity ratio between the operating tools obtained from information on the pressure intensity detected by the pressure intensity detection function; and
    a function providing function of providing a predetermined function corresponding to the predetermined relative information detected by the relative information detection function.

13. A non-transitory computer readable medium storing a program for causing a computer to realize:
    an imaging function of capturing, in a case light emitted from within a screen to outside is reflected by an operating tool pressing the screen, an image of the operating tool pressing the screen by forming an image from the reflected light; and
    a pattern image detection function of detecting, from pattern images prepared in advance, a predetermined pattern image that is approximate to the image of the operating tool captured by the imaging function,
    wherein, in a case the screen is pressed by a plurality of operating tools and images of the operating tools are captured by the imaging function, the computer is caused to realize a function of detecting a predetermined pattern image to which a relative position of each of the operating tools included in the image captured by the imaging function and a size ratio between each of the operating tools are approximate.

* * * * *